US009621444B2

(12) United States Patent
Liu et al.

(10) Patent No.: US 9,621,444 B2
(45) Date of Patent: Apr. 11, 2017

(54) METHOD AND DEVICE FOR HANDLING DROPPED DATA PACKETS

(71) Applicant: TELEFONAKTIEBOLAGET L M ERICSSON (PUBL), Stockholm (SE)

(72) Inventors: Di Liu, Shanghai (CN); Feng Guo, Shanghai (CN); Yingjiao He, Shanghai (CN); Yong Yang, Kållered (SE); Jingzhe Zhang, Shanghai (CN); Nan Zhang, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/649,525

(22) PCT Filed: Dec. 18, 2012

(86) PCT No.: PCT/CN2012/086826
§ 371 (c)(1),
(2) Date: Jun. 3, 2015

(87) PCT Pub. No.: WO2014/094228
PCT Pub. Date: Jun. 26, 2014

(65) Prior Publication Data
US 2015/0333991 A1 Nov. 19, 2015

(51) Int. Cl.
*H04W 88/08* (2009.01)
*H04L 12/26* (2006.01)
(Continued)

(52) U.S. Cl.
CPC ...... *H04L 43/0829* (2013.01); *H04L 12/1407* (2013.01); *H04L 41/0893* (2013.01);
(Continued)

(58) Field of Classification Search
CPC .................................................... H04W 88/08
(Continued)

(56) References Cited

U.S. PATENT DOCUMENTS 5,526,344 A * 6/1996 Diaz ..................... H04J 3/1611
370/364
6,377,590 B1 * 4/2002 Hoppal ................. H04J 3/0632
370/528
(Continued)

FOREIGN PATENT DOCUMENTS

CN 102148747 A 8/2011

OTHER PUBLICATIONS

3GPP, 3rd Generation Partnership Project; Technical Specification Group Radio Access Network; UTRAN Iu interface Radio Access Network Application Part (RANAP) signalling (Release 9), 3GPP TS 25.413 V9.6.0, 2011, 405 pages.
(Continued)

*Primary Examiner* — William D Cumming
(74) *Attorney, Agent, or Firm* — Rothwell, Figg, Ernst & Manbeck, P.C.

(57) ABSTRACT

Disclosed herein is a first network node and a method in the first network node and a charging node and a method in the charging node for handling dropped data packets in a communications network, comprising: obtaining information indicating dropped data packets for a wireless device served by the first network node; detecting based on the obtained information that an amount associated with the dropped data packets reaches a first threshold or that a timer associated with the dropped data packets reaches a second threshold; and transmitting a message to a policy node, which message comprises at least one of information indicating the amount associated with the dropped data packets or information indicating that the amount has reached the first threshold or indicating that the timer has reached the second threshold.

27 Claims, 13 Drawing Sheets

(51) Int. Cl.
*H04M 15/00* (2006.01)
*H04L 12/14* (2006.01)
*H04L 12/923* (2013.01)
*H04L 12/24* (2006.01)

(52) U.S. Cl.
CPC ......... *H04L 43/0835* (2013.01); *H04L 43/16* (2013.01); *H04L 47/762* (2013.01); *H04M 15/41* (2013.01)

(58) Field of Classification Search
USPC ................. 370/252, 365, 389, 528; 455/418
See application file for complete search history.

(56) References Cited

U.S. PATENT DOCUMENTS

| | | | | |
|---|---|---|---|---|
| 6,505,244 | B1* | 1/2003 | Natarajan | H04L 12/5695 709/223 |
| 2008/0198845 | A1* | 8/2008 | Boman | H04L 29/12188 370/389 |
| 2008/0285475 | A1* | 11/2008 | Menditto | G06Q 30/0283 370/252 |
| 2011/0263238 | A1* | 10/2011 | Riley | H04M 15/00 455/418 |
| 2012/0039175 | A1* | 2/2012 | Sridhar | H04L 47/125 370/236 |
| 2013/0203398 | A1* | 8/2013 | Callard | H04W 88/08 455/418 |
| 2014/0160952 | A1* | 6/2014 | Astigarraga | H04L 43/10 370/252 |
| 2015/0036510 | A1* | 2/2015 | Bao | H04L 43/0811 370/241.1 |

OTHER PUBLICATIONS

3GPP, 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11), 3GPP TS 29.274 V11.3.0, 2012, 219 pages.

3GPP, 3rd Generation Partnership Project; Technical Specification Group Core Network and Terminals; General Packet Radio System (GPRS) Tunnelling Protocol User Plane (GTPv1-U) (Release 11), 3GPP TS 29.281 V11.3.0, 2012, 26 pages.

3GPP, 3rd Generation Partnership Project; Technical Specification Group Core Network and Terminals; General Packet Radio System (GPRS); GPRS Tunnelling Protocol (GTP) across the Gn and Gp interface (Release 11), 3GPP TS 29.060 V11.3.0, 2012, 174 pages.

3GPP, 3rd Generation Partnership Project; Technical Specification Group Radio Access Network; Evolved Universal Terrestrial Radio Access Network (E-UTRAN); S1 Application Protocol (S1AP) (Release 11), 3GPP TS 36.413 V11.0.0, 2012, 258 pages.

* cited by examiner

Fig. 5: Report dropped packet information via the User Plane

Fig. 6: Report dropped packet information via the Control Plane

Fig. 7 : SGW generates negative CDR.

Fig. 8 SGW generate negative CDR.

Fig. 9 eNB directly reports negative CDR towards OFCS

METHOD AND DEVICE FOR HANDLING DROPPED DATA PACKETS

CROSS REFERENCE TO RELATED APPLICATION(S)

This application is a 35 U.S.C. §371 National Phase Entry Application from PCT/CN2012/086826, filed Dec. 18, 2012, designating the United States, the disclosure of which is incorporated herein in its entirety by reference.

TECHNICAL FIELD

Embodiments herein relate generally to a first network node and a method in the first network node and to a charging node and a method in the charging node. More particularly the embodiments herein relate to handling dropped data packets in a communications network.

BACKGROUND

In a typical communications network, also referred to as e.g. a wireless communications network, a wireless communications system or a communications system, a device, communicates via a Radio Access Network (RAN) to one or more Core Networks (CNs).

The device may be a device by which a subscriber may access services offered by an operator's network and/or services outside operator's network to which the operators radio access network and core network provide access, e.g. access to the Internet. The device may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device or any type of consumer electronic, for instance but not limited to television, radio, lighting arrangements, tablet computer, laptop or Personal Computer (PC). The device may be portable, pocket storable, hand held, computer comprised, or vehicle mounted devices, enabled to communicate voice and/or data, via the radio access network, with another entity, such as another device or a server.

Devices are enabled to communicate wirelessly in the communications network. The communication may be performed e.g. between two devices, between a devices and a regular telephone and/or between the devices and a server via the radio access network and possibly one or more core networks and possibly the Internet.

The radio access network covers a geographical area which is divided into cell areas, with each cell area being served by a base station, e.g. a Radio Base Station (RBS), which in some radio access networks is also called evolved NodeB (eNB), NodeB, B node or base station. A cell is a geographical area where radio coverage is provided by the radio base station at a base station site. The base stations communicate with the devices within range of the base stations.

Charging is an important aspect in a communications network. The operators of the networks needs to manage the data traffic in the communications networks in order to make a fair revenue from the services it provides to its subscribers. The Policy and Charging Control (PCC) has been developed by the 3GPP in order to facilitate this. An important node in PCC is the Policy Control and Charging Rules Function (PCRF). The PCRF is a functional element that generates PCC rules, provides policy control and flow based charging control decisions. The PCRF interfaces with a Packet data network GateWay (PGW) and takes charging enforcement decisions on its behalf. The PCRF provides the PCC rules to a Policy and Charging Enforcement Function (PCEF). The PCEF is implemented in the PGW or a Serving GateWay (SGW) and is responsible for making sure that the PCC Rules are followed. It also provides usage measurement to support charging.

In order to support charging functionality and charging management in 3GPP network, the network performs online and/or offline charging using an Online Charging System (OCS) and an OFfline Charging System (OFCS). Offline charging is a charging mechanism where charging information does not affect, in real-time, the service rendered. Charging information for network resource usage is collected concurrently with that resource usage. Charging Data Record (CDR) files are generated by the network, which are then transferred to the network operator's billing domain for the purpose of subscriber billing. The OFCS receives events from a PCEF and generates CDRs for the billing system.

Online charging is a charging mechanism where charging information may affect, in real-time, the service rendered and therefore a direct interaction of the charging mechanism with bearer/session/service control etc is required. Charging information for network resource usage is collected concurrently with that resource usage in the same fashion as in offline charging. However, authorization for the network resource usage must be obtained by the network prior to the actual resource usage to occur. This authorization is granted by the OCS upon request from the network. When the network receives a network resource usage request, it collects the relevant charging information and generates a charging event towards the OCS in real-time. The OCS then returns an appropriate resource usage authorization. OCS provides credit management and grants credit to the PCEF based on time, traffic volume or chargeable events.

Offline and online charging may be performed simultaneously and/or independently for the same chargeable event. A chargeable event may be an activity that an operator wants to charge for. The activity may utilize communications network resources and/or related services for device to device communication, device to network communication, inter-network communication or mobility or similar.

A packet is an information unit comprising two types of information: control information and user data. The user data is also known as payload and is the part of the transmitted packet which is the purpose of the transmission, excluding the information sent together with it, i.e. the control information which is solely to facilitate delivery of the packet. A packet may be sent in DownLink (DL) or UpLink (UL). Downlink may be defined as transmission of signals from a Radio Access Network (RAN) access point or network to a device. Uplink may be defined as transmission of signals from a device to a RAN access point or network.

The General Packet Radio Service (GPRS) Tunnelling Protocol (GTP) is a group of IP-based communications protocols used to carry GPRS within e.g. Global System for Mobile communications (GSM), Universal Mobile Telecommunications System (UMTS) and Long Term Evolution (LTE) networks. GTP may be decomposed into separate protocols, GTP-Control plane (GTP-C), GTP User plane (GTP-U) and GTP'. GTP-C is used for control plane signaling between GPRS Support Nodes (GSN) in the core network. GTP-U is used for carrying user data within the core network and between the radio access network and the core network. GTP' is a charging protocol. GTP may be used with User Datagram Protocol (UDP) or Transmission Control Protocol (TCP). There is a version 1 and a version 2 of GTP. The GTP-U, GTP-C and GTP' have certain features in common. The structure of the GTP messages is the same with a GTP header following a UDP/TCP header. The GTP header has a plurality of fields, such as for example version field, Protocol Type (PT), Next Extension Header etc. At least some of these fields will be described in more detail later.

In a communications network, e.g. using 3GPP access, the radio access network is often the bottleneck for the throughput, i.e. payload packets may be dropped e.g. when there is congestion in the radio network, or when radio condition is poor. However such dropping is not feedback to the charging node and/or function, e.g. to the PGW/PCRF, which may represent a Policy and Charging Control (PCC) function. In other words, dropped packets are still charged. The PCC entities in a network cannot adjust the QoS policy to help to reduce such packets dropping, e.g. to improve QCI/ARP to let the device have a better position to compete with other devices about the available radio resources.

Packets may be dropped when one or more packets of data travelling across a network fail to reach their destination. In the downlink direction, some packets might be dropped by e.g. the eNB or SGW due to several reasons, for example, radio status, node congestion, transport status, etc. Especially in an Evolved Packet System (EPS) network, the downlink speed may reach up to 100M+ bps or more, so the downlink packets dropped by the eNB or the SGW have increased and may increase in the future. Even though the payload has not arrived at the device, it has been charged in a charging node such as e.g. the PGW, no matter online charging or offline charging.

FIG. 1 is a schematic block diagram illustrating points where packets may be dropped in a communications network 100. The communications network 100 in FIG. 1 comprises an E-UTRAN 101 communicating with a device 103 over a LTE-Uu interface. The E-UTRAN may be represented by for example an eNB. In the following, the terms E-UTRAN and eNB are used interchangeably with the reference number 101. E-UTRAN is an abbreviation for Evolved-Universal Terrestrial Radio Access Network. The E-UTRAN 101 is connected to a Mobility Management Entity (MME) 105 via a S1-MME interface. The MME 105 is connected to a Serving GPRS Support Node (SGSN) 108 via a S3 interface. The MME 105 is further connected to a Home Subscriber Server (HSS) 110 via an S6a interface and to a Serving GateWay (SGW) 113 via a S11 interface. The SGW 113 is connected to the E-UTRAN 101 via a S1-U interface. The SGW 113 is further connected to Universal Terrestrial Radio Access Network (UTRAN) 115 via a S12 interface and to a GSM EDGE Radio Access Network (GERAN) 118 via a S4 interface. EDGE is short for Enhanced Data rates for GSM Evolution. In addition, the SGW 113 is connected to a Packet data network GateWay (PGW) 120 via a S5 interface. The PGW 120 is connected to an OFfline Charging System (OFCS) 123 via a Gz interface and to a Policy and Charging Rules Function (PCRF) 125 via a Gx interface. The PGW 120 is connected via a SGi interface to an operator's IP services 128, e.g. such as IP Multimedia Subsystem (IMS), Packet Switch Streaming (PSS) or similar. The PCRF 125 is connected to the operators IP services 128 via an Rx interface.

As showed in FIG. 1, in the downlink direction (from the core network) to the device 103), the black circles indicate locations where payload packets may be dropped for some reasons, e.g. caused by radio situation, full buffer in the nodes, link congestion or similar. Even though the packets are dropped, the charging node and/or function, e.g. the PGW 120 comprising a PCEF, charges these dropped Packets by using a Charging Data Record (CDR), e.g. based on service type. CDR is a collection of information indicating a chargeable event for use in billing and accounting. Examples of a chargeable event may be time of call set-up, duration of the call, amount of data transferred, etc.

US 2012/0307730 discloses that a SGSN reports unsent octets of a Radio Network Controller (RNC) to a Gateway GPRS Support Node (GGSN) in connection with a message intended for other purposes. The SGSN creates information relating to unsuccessfully transmitted downlink data volume. The information is comprised in an information element which is pre-determined for unsuccessfully transmitted downlink data volume. The information element is referred to as "RNC Unsent Downlink Volume". The information element is further comprised in one of a PDP context activation, PDP context modification and PDP context deactivation message. When the GGSN receives the RNC Unsent Downlink Volume from the SGSN, the GGSN generates CDR with a record of the volume of unsent downlink data. Thus, the possibility of overcharging for downlink data volume in the billing system may be prevented.

In an EPS network, as well as UMTS and GPRS network, a gateway is responsible for generating/sending CDR to OFCS for offline charging purpose.

In an existing method discarded packets are reported from the radio access network to the SGW/PGW. For example, 3GPP 32.298, version 11.4.0, section 5.1.2.2.53 describes the field "RNC Unsent Downlink Volume" for UMTS as follows: "This field contains the unsent downlink volume that the RNC has either discarded or forwarded to 2G-SGSN and already comprised in S-CDR. This field is present when RNC has provided unsent downlink volume count at RAB release and may be used by a downstream system to apply proper charging for this PDP context." RAB is short for Radio Access Bearer. The "RNC unsent downlink volume" is only related to the RNC, which applies to UMTS. The eNB in EPS has the same function as the RNC in UMTS, however the 3GPP standard does not describe how to apply proper charging for the PDN connection/bearer context in EPS. Furthermore, it may be noted that the existing method only reports dropped information in relation to RAB release. It may also be noted that the existing method only supports PDP/bearer level.

SUMMARY

An object of the embodiments herein is therefore to obviate at least one of the above disadvantages and to provide improved handling of dropped packets in a communications network.

According to a first aspect, the object is achieved by a method in a first network node for handling dropped data packets in a communications network, the method comprising: obtaining information indicating dropped data packets for a wireless device served by the first network node; detecting based on the obtained information that an amount associated with the dropped data packets reaches a first threshold or that a timer associated with the dropped data packets reaches a second threshold; and transmitting a message to a policy node, which message comprises at least one of information indicating the amount associated with the dropped data packets or information indicating that the amount has reached the first threshold or indicating that the timer has reached the second threshold.

According to a second aspect, the object is achieved by a method in a policy node for handling dropped data packets in a communications network, the method comprising: receiving a message from a first network node serving a wireless device, which message comprises at least one of information indicating an amount associated with dropped data packets for the wireless device or information indicating that the amount associated with the dropped data packets has reached a first threshold or indicating that a timer associated with the dropped data packets has reached a second threshold; and adjusting charging or policy for the wireless device or for a group of wireless devices to which the wireless device belongs, based on the received message.

According to a third aspect, the object is achieved by the first network node for handling dropped data packets in a communications network, the first network node comprising: an obtaining unit adapted to obtain information indicating dropped data packets for a wireless device served by the first network node; a detector adapted to detect based on the obtained information that an amount associated with the dropped data packets reaches a first threshold or that a timer associated with the dropped data packets reaches a second threshold; and a transmitter adapted to transmit a message to a policy node, which message comprises at least one of information indicating the amount associated with the dropped data packets or information indicating that the amount has reached the first threshold or indicating that the timer has reached the second threshold.

According to a fourth aspect, the object is achieved by the policy node for handling dropped data packets in a communications network, the policy node comprising: a receiver adapted to receive a message from a first network node serving a wireless device, which message comprises at least one of information indicating an amount of dropped data packets for the wireless device or information indicating that the amount associated with the dropped data packets has reached a first threshold or that a timer associated with the dropped data packets has reached a second threshold; and an adjusting unit adapted to adjust charging or policy for the wireless device or for a group of wireless devices to which the wireless device belongs, based on the received message.

Since the first network node, reports information indicating data packet dropping to the core network, e.g. the policy node and/or a second network node, it is possible to produce a more accurate charging data record. For example, based on the amount of dropped data packets or on a timer, the first network node reports dropped data packets to the policy node. The dropped data packets have been transmitted in order to be received by the wireless device, but they have not been received by the wireless device. By reporting these dropped data packets to the policy node, the policy node can take this into account when performing charging and avoid charging data packets which have not arrived at the wireless device.

Embodiments herein afford many advantages, of which a non-exhaustive list of examples follows:

An advantage of the embodiments herein may be that they increase charging accuracy and supports all legacy charging functions.

Another advantage of the embodiments herein may be that they decrease the whole network resource on solving "discard packets" charging issues.

Another advantage of the embodiments herein may be that they re-use legacy network architecture and is therefore easy to implement.

Furthermore, an advantage of the embodiments herein may be that the negative CDR may give discard packets statistics, and help operators to optimize their networks.

A further advantage of the embodiments herein may be that the periodic report may increase the accuracy, i.e. legacy only report when RAB release.

Another advantage of the embodiments herein may be that they decrease the overcharging in the mobile data network when the charging based on content is deployed.

A further advantage may be that the dropped packets information may be input for adjusting the Quality of Service (QoS) at the charging node, e.g. PCEF/PCRF, in cases such as when OLP has happened within the network.

Furthermore, another advantage of the embodiments herein may be that use of GTP-U, GTP-C increases flexibility, especially the GTP-U saves radio resource.

Another advantage is that the embodiments herein may be used in WCDMA and WLAN and GSM.

A further advantage may be that the embodiments herein improve the charging precision for content/service based charging.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

DETAILED DESCRIPTION

Figure 1:
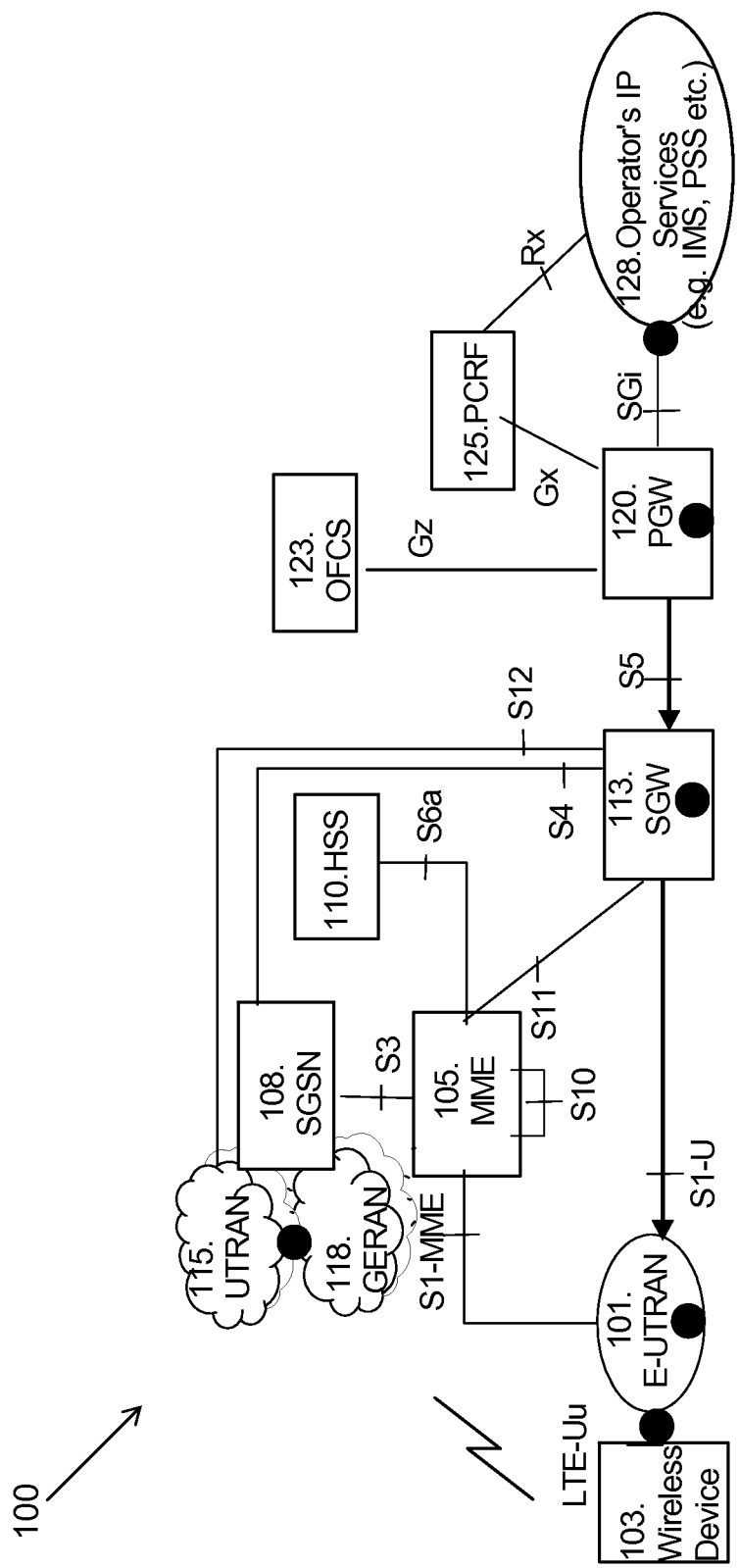
FIG. 1 is a schematic block diagram illustrating embodiments of an EPS network.

Today operators aim to build a service aware Mobile Data Network, such as the introduction of Service identification for improved radio utilization for GERAN (SIRIG) in 3GPP, which allows the PGW to pass a Service Class Indicator (SCI) per Application or per a set of applications with requiring similar Radio Resource Management (RRM) treatment, e.g. instant messaging. Examples of an application may be video, audio, etc. Based on the future demands of the operators, the SIRIG will be extended to other radio access technologies, e.g. UMTS, LTE in the coming 3GPP releases. No matter which kind of radio access technology, data packet dropping cannot be avoided. Dropping of data packets may be due to various problems. Regardless of the cause of the dropping of data packets, the data packet dropping should be reported to the policy and/or charging nodes in order to have a substantially accurate Charging Data Record (CDR), which has been requested by some operators. When the dropped data packet reporting may be performed per application, it also makes it possible to let the network adjust the authorized Quality of Service (QoS) in order to place the concerning wireless device in a better position for resource competition. Reporting of the dropped data packets also makes it possible to let the network have a statistical overview of applications, knowing the perception of the wireless device for certain services. It even makes it possible to let the network, e.g. PGW, discard some data packets belonging to certain applications to avoid further overload of the user plane/air interface in the radio network. This may be done by using an embedded cause code indicating the reason of dropping together with the report of packets dropping. The cause code may be pre-defined in source node.

Embodiments herein enables a radio access network node to report information indicating dropped packets to a core network node, for example the PCEF and/or the PCRF, preferably via either control plane or user plane, e.g. to enable the production of a more accurate CDR and/or to allow a PCC function to adjust the Quality of Service (QoS) based on the report which is preferably made per application. In short, based on configuration of a threshold which is associated with either time and/or volume, the radio access network node may report information indicating unsent data to the policy and/or charging node, e.g. PGW/PCRF. The unsent data could be per volume and/or per ratio, e.g. unsent volume to the total volume, on the granularity of per application, which may be identified either by a Service Class Indicator, or packet filter information retrieved by the radio access network node. In addition, such report may be made only for some of the applications which are of interest to have more precised policy and charging control. The application may be for example video traffic, M2M traffic, etc.

Furthermore, the embodiments herein provide a "negative CDR" concept. When a node located downstream after the PGW, e.g. the SGW or the eNB, discards packets, it may generate and/or send a negative CDR towards the OFCS directly. A flag may be comprised in the CDR to represent that the type of CDR is negative. When the OFCS knows the amount of packets that is discarded it may take action to make a correct charging. When another node with a charging function (for example, TDF), is deployed in the network, then PGW may also use embodiments herein to the report negative CDR to the OFCS. When online charging is used, such negative CDR concept may be extend to "negative quota", where either such "negative quota" is added to the authorized quota in the PCEF, e.g. PGW, or where such "negative quota" is reported to the OCS to be considered when authorizing the next quota.

Figure 2:
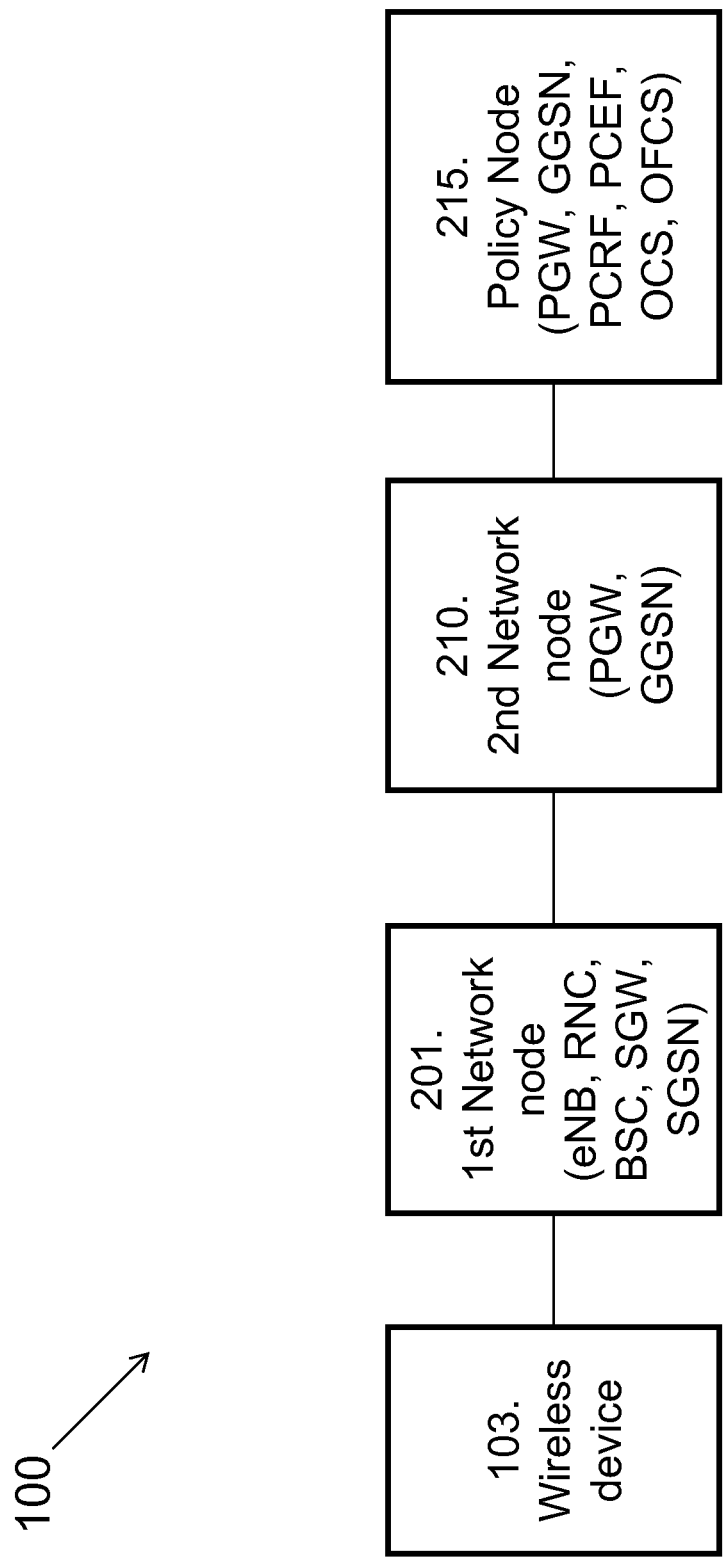
FIG. 2 is a schematic block diagram illustrating embodiments of a communications network.

FIG. 2 depicts a communications network 100 in which embodiments herein may be implemented. The communications network 100 may in some embodiments apply to one or more radio access technologies such as for example GSM, LTE, LTE Advanced, Wideband Code Division Multiple Access (WCDMA), or any other suitable Third Generation Partnership Project (3GPP) radio access technology, or other radio access technologies such as Wireless Local Area Network (WLAN) or Code division multiple access (CDMA) access.

The communications network 100 comprises a first network node 201. The first network node may be located downstream after a Packet data network GateWay (PGW) or similar in the communications network 100. The first network node 201 may be at least one of a base station, eNB and NodeB and Radio Network Controller (RNC) and Base Station Controller (BSC) and Serving GateWay (SGW) and Serving General packet radio service Support Node, (SGSN). The eNB, NodeB, RNC and the BSC are radio access network nodes, i.e. not core network nodes such as the SGSN, SGW and the PGW. The eNB is comprised in the radio access network of LTE. NodeB is comprised in the radio access network of UTRAN. A RNC is a node in charge of controlling the use and the integrity of the radio resources and which controls the NodeB in UTRAN. A BSC is in charge of controlling the use and the integrity of the radio resources and it controls a base transceiver station or base station in GSM. The SGW and the PGW are example of possible gateways in the core network part of the communications network 100 and deal with the user plane. The SGW and the PGW transport the IP data traffic between the wireless device and external networks. According to the 3GPP, the SGW is the point of interconnect between the radio-side and the Evolved Packet Core (EPC). As its name indicates, the SGW serves the wireless device by routing the incoming and outgoing IP packets. The SGW is logically connected to the other gateway, the PGW. The PGW is the point of interconnect between the EPC and the external IP networks called Packet Data Network (PDN). The PGW routes packets to and from the PDNs. The PGW also performs various functions such as IP address/IP prefix allocation or policy control and charging. The SGSN is a core network node responsible for delivery of data packets to and from the wireless device within its geographical service area. Its tasks comprises packet routing and transfer, mobility management, logical link management, and authentication and charging functions. The location register of the SGSN stores location information (e.g., current cell, current VLR) and user profiles (e.g., International Mobile Subscriber Identity (IMSI), address(es) used in the packet data network) of all wireless devices registered with this SGSN.

The first network node 201 is capable of communicating with a wireless device 103. The wireless device 103 may be a device by which a subscriber may access services offered by an operator's network and services outside operator's network to which the operators radio access network and core network provide access, e.g. access to the Internet. The wireless device 103 may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device or any type of consumer electronic, for instance but not limited to television, radio, lighting arrangements, tablet computer, laptop or Personal Computer (PC). The wireless device 103 may be portable, pocket storable, hand held, computer comprised, or vehicle mounted devices, enabled to communicate voice and/or data, via the radio access network, with another entity, such as another device or a server.

The communications network 100 further comprises a second network node 210 which is configured to be connected to the first network node 201 and to a policy node 215. The second network node may be for example a PGW or a GGSN. The second network node may comprise a Policy and Charging Enforcement Function (PCEF).

The policy node 215 may be comprised in an Online Charging System (OCS) or in an OFfline Charging System (OFCS). In some embodiments, the policy node 215 is a PGW. In some embodiments, the policy node 215 comprises a Policy and Charging Rules Function (PCRF) or a Policy and Charging Enforcement Function (PCEF). OCS is a system enabling a communications service provider to charge their customers, in real time, based on service usage. OFCS is a process for collecting charging data after a wireless device 103 has used network resources. CDR files are generated by the policy node 215, which are then transferred to the network operator's Billing Domain for the purpose of subscriber billing and/or inter-operator accounting (or additional functions, e.g. statistics, at the operator's discretion).

The method for for handling dropped data packets in the communications network 100, according to some embodiments will now be described with reference to the signalling diagram depicted in FIG. 3. The method comprises the following steps, which steps may as well be carried out in another suitable order than described below.

Step 301

In some embodiments, the first network node 201 transmits information indicating that the first network node 201 supports handling of dropped data packets. The first network node 201 transmits this information to at least one of the second network node 210 or the policy node 215. This information may be transmitted via control plane signaling.

Step 302

In some embodiments, the node which receives the information from the first network node 201 in step 301, i.e. the second network node 210 or the policy node 215, determines which data flow that should be subject to handling of dropped data packets. This means that the data flow to a certain wireless device, e.g. the wireless device 103, may be subject to handling of dropped data packets or the data flow to a group of wireless devices of which the wireless device 103 belongs may be subject to the handling of dropped data packets.

Step 303

In some embodiments, the node which determined which data flow that should be subject to handling of dropped data packets in step 302 transmits information indicating the data flow that should be subject to handling of dropped data packets to the first network node 201. In other words, the second network node 210 or the policy node 215 subscribes to the service which the first network node 201 offers, i.e. the service of handling dropped data packets. This information may be transmitted via control plane signaling.

Instead of performing steps 301-303, the first network node 201 may be preconfigured with information indicating which data flow that should be subject to handling of dropped data packets, i.e. which wireless device or which group of wireless devices that should be subject to handling of dropped data packets.

Step 304

The first network node 201 monitors the data packets it has transmitted and which are intended for the wireless device 103. The data packets may e.g. be received from any other node in the core network, e.g. such as the SGSN, SGW, GGSN or PGW or similar in the various embodiments. It is preferred that the received data packets are downlink data packets, e.g. transmitted downstream from the core network towards the wireless device 103.

Step 305

When performing the monitoring in step 304, the first network node 201 detects when a data packet is dropped for the wireless device 103. There may be several reasons for the first network node 201 to drop a data packet, for example bad radio quality, a buffer in the first network node 201 is full, load, node congestion, radio status, transport status etc. The detection of dropped data packets may be done in any well known manner, e.g. by counting the packets transmitted by the first network node 201 to the wireless device 103, and then receiving a report from the wireless device 103 indicating the number of data packets actually received from the first network node 201. A simple comparison of the sent and received data packets will then give the number of dropped data packets.

Step 306

When the first network node 201 monitors the data packets transmitted to the wireless device 103 and detects a dropped data packet, it keeps track of the amount of dropped data packets. The first network node 201 may keep track of the amount by e.g. increasing a counting parameter with one each time a dropped data packet is detected. At the same time as the amount of dropped data packets, a timer is running. The timer may start when the first dropped packet is detected in step 305.

Step 307

The first network node 201 checks whether the amount of dropped data packets has reached a first threshold and/or whether a timer associated with the dropped data packets has reached a second threshold, i.e. that the timer has expired. This may be performed by way of for example a continuous monitoring of the amount of dropped data packets or by checking the amount of dropped data packets at certain time instances. The timer may expire e.g. after 120 seconds. The first network node 200 may be configured to operatively determine the amount and/or timer. The first network node 200 may be configured to operatively receive information indicating the amount and/or timer e.g. from the second node 210 and/or from any other node in the core network of communications network 100.

Step 308

When the amount of dropped data packets has reached the first threshold or the time has reached the second threshold, the first network node 201 generates and transmits a message comprising information indicating dropped data packets to the policy node 215. The information may be information indicating the cause of the dropped data packets. The information may comprise the amount of dropped data packets. The information may comprise a parameter indicating a ratio of dropped data packets and total transmitted data packets, or a parameter indicating a ratio of dropped data packets per sent data packets per 5-TUPLE. The information indicating the amount of dropped data packets may comprise a parameter indicating a ratio of dropped volume per total volume, or a parameter indicating a ratio of dropped volume per sent volume per 5-TUPLE. The information may comprise a negative CDR indicator. The negative CDR indicator will be described later with reference to FIGS. 7-9.

The message comprising the information indicating dropped data packets may be reported to the policy node 215 in at least one of the following ways:

a) To the policy node 215 via the user plane, using a new GTP-U message or a new GTP-U header extension; or
b) To the policy node 215 via the control plane; or
c) Directly to the policy node 215; or
d) To the policy node via the second network node 210.

The items a)-d) are described in more detail with reference to FIG. 4 below.

The first network node 201 may transmit this message at the same time as the threshold has been reached or the timer has expired, or the first network node 201 may transmit the message at a time after the threshold has been reached or the timer has expired.

Step 309

The policy node 215 adjusts at least one of the charging and policy for the wireless device 103 or for a group of wireless devices to which the wireless device 103 belongs, based on the received information indicating dropped data packets in step 306. This way, the subscriber associated with the wireless device 103 is not charged for dropped data packets which have not arrived at the wireless device 103.

Step 310

In some embodiments, the policy node 215 may mitigate the cause of dropped data packets. As mentioned above, the information indicating the dropped data packets may be information indicating the cause of the dropped data packets, which is the basis for the policy node 215 to know which cause to mitigate.

Figure 4:
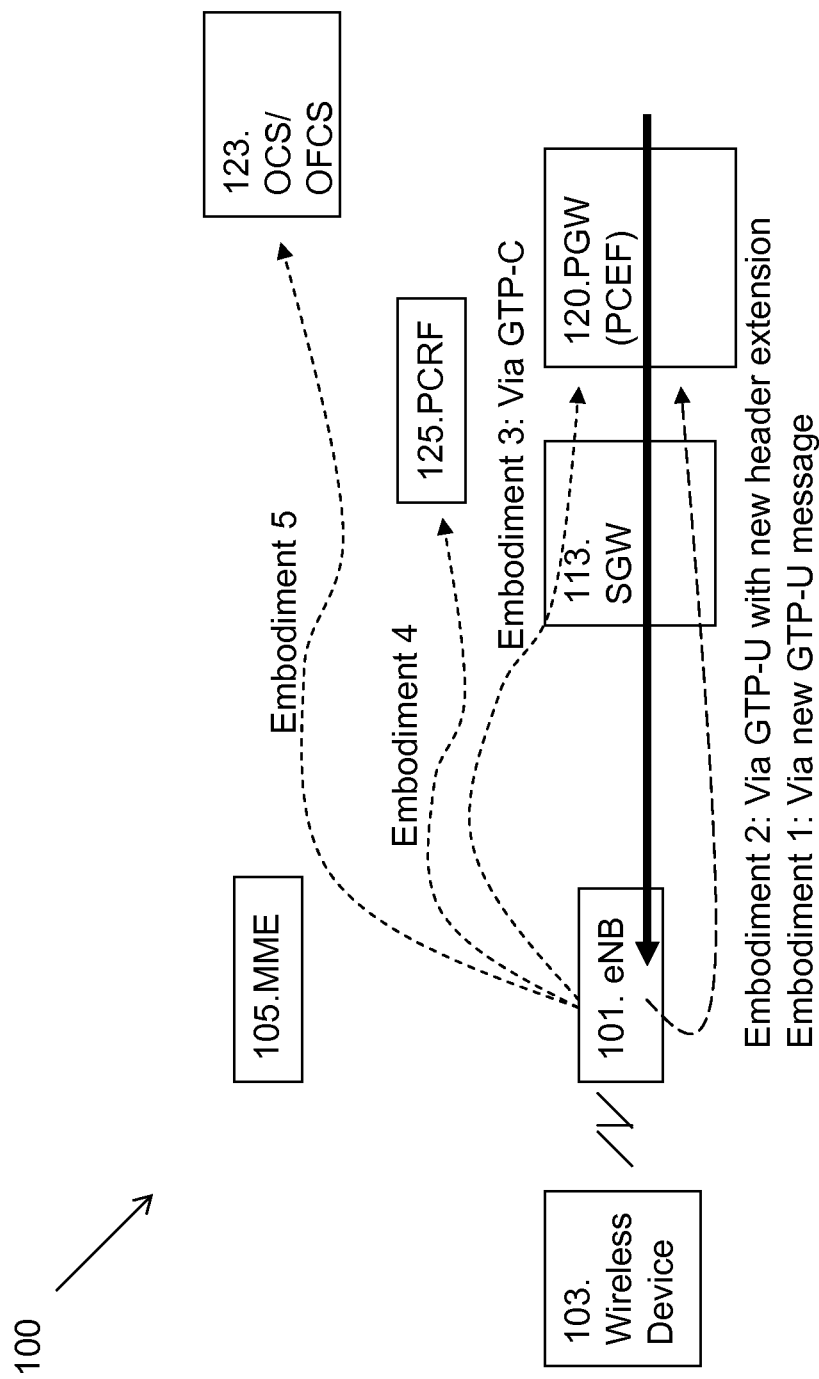
FIG. 4 is a signaling diagram illustrating embodiments of a method for reporting dropped packet information via User Plane.

FIG. 4 illustrates some alternative embodiments for sending the information indicating an amount of dropped data packets from the first network node 201 to the policy node 215, i.e. step 308 above.

Embodiment 1

This corresponds to item a) above. In this embodiment, the first network node 201 is exemplified with the eNB 101 and the policy node 215 is exemplified with the PGW 120 comprising PCEF. The information indicating the amount of dropped data packets is transmitted from the eNB 101 to the PGW 120 via the user plane, i.e. comprise information indicating the amount of dropped data packets in the GTP-U header extension. The information may be sent from the eNB 101 via the uplink GTP-U for the payload packet to the PGW 120.

Embodiment 2

This corresponds to item a) above. In this embodiment, the first network node 201 is exemplified with the eNB 101 and the policy node 215 is exemplified with the PGW 120 comprising PCEF. The information indicating the amount of dropped data packets is transmitted from the eNB 101 to the PGW 120 via the user plane and comprises the information indicating the amount of dropped data packets in a new GTP-U message, for example called "Status Report".

Embodiment 3

This corresponds to item b) above. In this embodiment, the first network node 201 is exemplified with the eNB 101 and the policy node 215 is exemplified with the PGW 120 comprising PCEF. The information indicating the amount of dropped data packets is transmitted from the eNB 101 to the PGW 120 via the control plane. For GSM, using e.g. BSSGP+GTP-C. For UTRAN, using e.g. RANAP+GTP-C. For E-UTRAN, using e.g. S1AP+GTP-C. The GTP-C message may be either the GTPv2 or GTPv1 message.

Embodiment 4

This corresponds to items c) and d) above. In this embodiment, the first network node 201 is exemplified with the eNB 101 and the policy node 215 is exemplified with the PCRF 125. The information indicating the amount of dropped data packets is transmitted from the eNB 101 directly to the PCRF 125 or via the PGW 120.

Embodiment 5

This corresponds to items c) and d) above. In this embodiment, the first network node 201 is exemplified with the eNB 101 and the policy node 215 is exemplified with the OCS/OFCS 120. The information indicating the amount of dropped data packets is transmitted from the eNB 101 directly to the OCS/OFCS 123 or via the PGW 120.

The embodiments above are applicable to any suitable radio access technologies such as for example. GSM, UMTS, LTE, CDMA2000 and so on.

An example of the information indicating dropped data packets reported to the policy node 215 may comprise at least as shown in table 1. Table 1 shows that it comprises 7 fields or Information Elements (IE) representing UE index, 5-tuple, SCI, amount, timer, threshold type, cause, service type and time range.

TABLE 1

| IE/Field definition | Description | Comments |
|---|---|---|
| UE index | GTP-U + F-TEID or GTP-C + F-TEID, as seen in tables 2 & 3 | |
| 5-tuple | Source IP address or IPv6 network prefix, destination IP address or IPv6 network prefix, source port number, destination port number, protocol ID of the protocol above IP | Present when SCI is NOT used |
| SCI | The SCI of the SDF, which may be received from PGW or obtained by eNB itself | Present when 5-tuple is NOT used |
| Amount | Bytes of amount threshold | For example, 3000 bytes |
| Time | Time threshold | For example, 120 seconds |
| Threshold type | Amount or time | Amount or Time |
| Cause | Reason of dropping packets | |
| Service type | Optional When available | |
| Time range | Optional Start time and end time of report | |

The UE index in table 1 is used to address the correct UE context and may comprise the GTP-U+F-TEID or GTP-C+F-TEID. F-TEID is short for Fully Qualified-Tunnel End Point Identifier and is used to indicate the type of Internet Protocol (IP) address and the type of interface where the bearer would take place.

The 5-tuple field comprises at least one of the source IP address or IPv6 network prefix, destination IP address or IPv6 network prefix, source port number, destination port number, protocol ID of the protocol above IP. Examples of these may be the IP address of the wireless device 103, the IP address of the PDN server, the wireless device port, the PDN server port and the protocol ID. The Protocol ID in the 5-tuple may be TCP, UDP, Stream Control Transmission Protocol (SCTP) or any other suitable protocol, and it may also be IPv6 or IPv4. The 5-tuple field is only present when the SCI is not used. The SCI field is associated with the Service Data Flow (SDF). The SCI may be received from the PGW 120 or it may be obtained by the eNB 101 itself when the eNB 101 has a packet inspection function. The SCI is present when the 5-tuple is not used.

The field amount comprises the amount dropped data packets, e.g. in bytes. The amount may be an amount to be ducted when generating the CDR. The amount may be for example 3000 bytes. The timer comprises the timer threshold which may be for example 120 seconds.

The threshold type may be an amount of dropped data packets or a time. The amount indicates the amount of dropped data packets for example in the unit of bytes. As mentioned in step 308 above, the information indicating the amount of dropped data packets may comprise a parameter indicating a ratio of dropped data packets and total transmitted data packets, or a parameter indicating a ratio of dropped data packets and sent data packets per 5-TUPLE. The information indicating the amount of dropped data packets may further comprise a parameter indicating a ratio of dropped volume and total volume, or a parameter indicating a ratio of dropped volume and sent volume per 5-TUPLE. These parameters may be derived from the data packets to be sent to the wireless device 103 to identify a service data flow or a Service Class Indicator (SCI) which is comprised in the downlink GTP-U packets by the PGW 120 as well as a cause code indicating the dropping reason. The data packets to be sent to the wireless device 103 are the payload part of GTP-U packets. When the eNB 101 receives the GTP-U payload packet, it needs to extract the payload part and send it to the wireless device 103, during this, the embodiments herein may require the eNB 101 to extract the 5-tuple information.

The cause indicates the reason to why the first network node 201 has dropped the data packets, such as a full buffer, overload, congestion etc.

Service Type is an optional information element which may be obtained by eNB self-diction, or it may be received from the PGW 120. The service type may be associated with the SCI.

The file time range is optional and comprises information indicating a start time and an end time of the reporting of dropped data packet information.

The eNB 101 may send out the original IP, TCP or UDP header of dropped data packets, and the PGW 120 comprising PCEF may derive the information, e.g. the 5-TUPLE and/or the SCI from the above table 1. The PGW 120 may further use this 5-TUPLE/SCI together with the information indicating the amount of dropped packets to add charging credit for this wireless device 103 and/or further transfer such information to the PCRF 125, and/or the OCS.

The information in table 1 may be comprised in a GTP-U message, it may be used for the GTP control plane, the interface between eNB and PCRF, and the interface between eNB and OFCS/OCS.

Table 2 is an example when the threshold is related to time. In table 2, there are rows representing the UE index, 5-TUPLE, SCI, Threshold type, Amount and Cause.

TABLE 2

| IE/Field definition | Description |
| --- | --- |
| UE index | GTP-U + F-TEID |
| 5-TUPLE | 192.168.1.1:23098 and 202.96.134.133:80 and TCP |
| SCI | 1 |
| Threshold type | Timer threshold |
| Time | E.g. 120 second |
| Cause | Bad radio quality |

In table 2 above, the column UE index indicates that the GTP-U and the F-TEID is used. The 5-TUPLE is an information element which refers to a set of five different values that make up a TCP/IP connection where the numbers in the 5-TUPLE rows are examples of wireless device port, server IP, server port and where TCP is an example of the transmitting protocol. The SCI indicates that a particular service data flow, i.e. wireless device 103 or group of wireless devices, is of interest to be subject to the handling of dropped data packets. The value 1 in the SCI is just an example. The exact service type of the SCI may be defined by the operator. As mentioned earlier, the information indicating the amount of dropped data packets may be transmitted when a threshold related to time or to the amount has been reached. Table 2 shows an example with the threshold is related to the time. In table 2, the time is exemplified with 120 second which means that the transmission of the information to the policy node 215 should be activated after 120 seconds. The GTP-message may also indicate the amount and cause of the dropped data packets, e.g. a bad radio quality. The amount may be an amount to be deducted when generating the CDR.

The information in table 1 may be comprised in a GTP-U message, it may be used for the GTP control plane, the interface between eNB and PCRF, and the interface between eNB and OFCS/OCS.

Table 3 is another example embodiment when the threshold is related to the amount. Table 3 has columns representing the UE index, 5-TUPLE, SCI, Amount, Threshold and Cause.

TABLE 3

| Information element | Description |
| --- | --- |
| UE index | GTP-U + F-TEID |
| 5-TUPLE | 192.168.1.1:23098 and 202.96.134.133:80 and UDP |
| SCI | 3 |
| Threshold type | Amount threshold |
| Amount | E.g. 3400 Bytes |
| Cause | Buffer full |

In table 3 above, the UE index indicates the GTP-U and the F-TEID. In table 3, the SCI has a value of 3. The threshold in table 3 is related to the amount of dropped data packets, in bytes, e.g. 3400, i.e. the information indicating dropped data packet should be transmitted when the amount has reached 3400 bytes. The operator may define the threshold amount. The cause of the dropped data packets is a full buffer.

The information in table 1 may be comprised in a GTP-U message, it may be used for the GTP control plane, the interface between eNB and PCRF, and the interface between eNB and OFCS/OCS.

The extension header that may be used in the example of a prior art G-PDU is showed below in Table 4.

TABLE 4

Extension header

| Octets | Bits | | | | | | | |
|---|---|---|---|---|---|---|---|---|
| | 8 | 7 | 6 | 5 | 4 | 3 | 2 | 1 |
| 1 | Version | | | PT | (*) | E = 1 | S | PN |
| 2 | Message Type = 255 | | | | | | | |
| 3 | Length (1$^{st}$ Octet) | | | | | | | |
| 4 | Length (2$^{nd}$ Octet) | | | | | | | |
| 5 | Tunnel Endpoint Identifier (1$^{st}$ Octet) | | | | | | | |
| 6 | Tunnel Endpoint Identifier (2$^{nd}$ Octet) | | | | | | | |
| 7 | Tunnel Endpoint Identifier (3$^{rd}$ Octet) | | | | | | | |
| 8 | Tunnel Endpoint Identifier (4$^{th}$ Octet) | | | | | | | |
| 9 | Sequence Number (1$^{st}$ Octet) | | | | | | | |
| 10 | Sequence Number (2$^{nd}$ Octet) | | | | | | | |
| 11 | N-PDU Number | | | | | | | |
| 12 | Next Extension Header Type | | | | | | | |

In octet 1, bit 1 comprises the PN which is short for Network-Packet Data Unit (N-PDU) Number and is a 1-bit value that states whether there is an N-PDU number optional field. In octet 1, bit 2 comprises a Sequence number flag(S) which is a 1-bit value that states whether there is a sequence number optional field. In octet 1, bit 3 comprises an Extension header flag (E) which is a 1-bit value that states whether there is an extension header optional field. As seen in table 4, E has the value 1 which indicates that there is an extension header. In octet 1, bit 4 is a spare bit that shall be sent as "0". The receiver shall not evaluate this bit. In octet 1, bit 5 comprises Protocol Type (PT) which is a 1-bit value that differentiates GTP (value 1) from GTP' (value 0). Bits 6-8 in octet 1 comprise a version field. For GTPv1, this has a value of 1. Octet 2 comprises a Message type which is a field that indicates the type of GTP message. The value 255 indicates that the GTP message is a G-PDU and the part that sends/receive the message is GTP-U. Octets 3 and 4 indicate the length of the payload. Octets 5-8 comprises Tunnel Endpoint IDentifiers (TEID) which is a field used to multiplex different connections in the same GTP tunnel. Note that in table 4, the TEID is same as the GTP-U packets which comprise information indicating dropped data packets. Octets 9 and 10 comprise sequence numbers. The sequence number exists when any of the E, S or PN bits is on. Octet 11 comprises an N-PDU number which exists when any of the E, S, or PN bits are on. Octet 12 comprises the next extension header type which exists when any of the E, S, or PN bits are on.

The octet 12 in table 4 above comprise the next extension header type. The next extension header type is described in more detail in Table 5. The left column in table 5 comprises next extension header field value and the right column comprises the type of extension header. One next extension header field value, exemplified with 00xx xxxx, comprises the information indicating dropped/sent downlink packets within one time frame, where each x in the value is either 0 or 1.

TABLE 5

| Next Extension Header Field Value | Type of Extension Header |
|---|---|
| 0000 0000 | No more extension headers |
| 0000 0001 | Reserved - Control Plane only. |
| 0000 0010 | Reserved - Control Plane only. |
| 00xx xxxx | Report dropped/sent packets downlink within one time frame |
| 0100 0000 | UDP Port. Provides the UDP Source Port of the triggering message. |

TABLE 5-continued

| Next Extension Header Field Value | Type of Extension Header |
|---|---|
| 1100 0000 | PDCP PDU Number [4]-[5]. |
| 1100 0001 | Reserved - Control Plane only. |
| 1100 0010 | Reserved - Control Plane only. |

Figure 5:
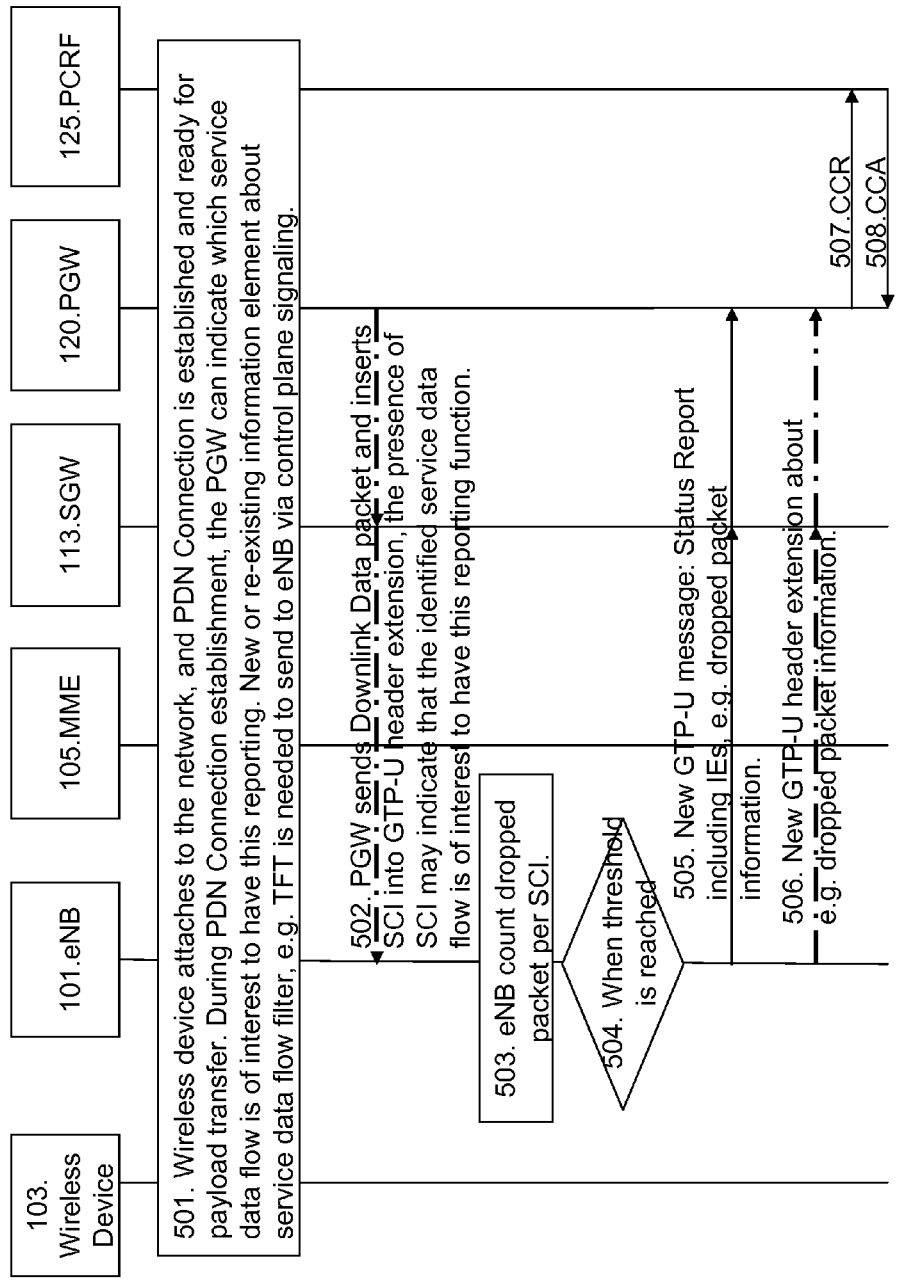
FIG. 5 is a signaling diagram illustrating embodiments of a method for reporting dropped packet information via the User Plane.

The embodiments 1-5 will now be described in more detail, starting with embodiments 1 and 2 relating to using the user plane to transmit the information indicating the dropped data packets. FIG. 5 is a signaling diagram illustrating embodiments of a method for handling of dropped data packets in the communications network 100 via the user plane. In FIG. 5, the first network node 201 is represented by the eNB 101 and the policy node 215 is represented by the PGW 120 and the PCRF 125. The method comprises the following steps, which steps may be performed in any suitable order:

Step 501

The wireless device 103 attaches to the network 100, and a PDN connection is established and is ready for payload transfer. During the PDN Connection establishment procedure, the eNB 101 indicates when it supports the embodiments herein in a request message, e.g. an initial wireless device message. The MME 105 and the SGW 113 forwards such information to the PGW 120. During the PDN Connection establishment, the PGW 120 may indicate which service data flow is of interest to be subject to the handling of dropped data packets (see step 502) together with the threshold to report. A new or re-existing information element, e.g. service data flow filter or TFT filter or SCI is used to send the information indicating which data flow that should be subject to the handling of dropped data packets from the PGW 120 to the eNB 101. This information is sent from the PGW 120 to the eNB 101 via control plane signaling.

As mentioned earlier, this may be seen as the PGW 120 subscribing to the service of the eNB 101 relating to the handling of dropped data packets.

Step 502

The PGW 120 sends a downlink data packet(s) intended for the wireless device 103. The downlink data packet (s) is carried in a G-PDU data packet. The parameter SCI may be inserted into the GTP-U header extension. The presence of SCI indicates that the identified service data flow is of interest to have the reporting function related to handling of dropped data packets. The 3GPP TS 29.274 defines G-PDU as follows: GTP user plane message, which carries the original packet (payload). G-PDU consists of GTP-U header and a T-PDU.

Note that the PCRF 125/PGW 120 may indicate certain service data flows which need to be reported during other procedures, e.g. PGW initiated bearer context modification procedure. This means that it is not indicated only during PDN connection establishment procedure as described in step 501 and 502.

Step 503

The eNB 101 counts the dropped data packet per SCI, i.e. per data flow. The eNB 101 counts the dropped data packets until the threshold is reached, e.g. time or the amount of packets or RAB release etc. The threshold may be pre-configured or it may be provided by the PGW 120. The count of dropped data packets may be done in any well known manner, e.g. by counting the packets transmitted by the eNB 101 to the wireless device 103, and then receiving a report from the wireless device 103 indicating the number of data packets actually received from the first network node 201. A simple comparison of the sent and received data packets will then give the number of dropped data packets.

Step 504

The eNB 101 detects when threshold has been reached. As mentioned earlier, the threshold may be related to the amount of dropped packets or to a timer. The threshold is then a trigger to transmit the information indicating the dropped data packets.

Step 505

When the eNB 101 detected in step 504 that the threshold has been reached in step 504, the eNB 101 transmits the information indicating the dropped packets in a new GTP-U message, e.g. status report, to the PGW 120. The new GTP-U message status report comprises information elements, e.g. dropped packet information together with 5-TUPLE or SCI, cause, service type and so on as indicated in the table 1. This is a step that is an alternative to step 506. In other words, step 505 may be performed instead of step 506.

Step 506

When the eNB 101 detected in step 504 that the threshold has been reached in step 504, the eNB 101 transmits the information indicating the dropped packets in a new GTP-U header extension with information indicating dropped packet information together with 5-TUPLE or SCI, cause, service type and so on as indicated in the tables 4 and 5. The information may comprise a negative CDR indicator, i.e. a negative amount to be deducted when generating the CDR. This is a step that is an alternative to step 505. In other words, step 506 is performed instead of step 505.

Step 507

When the PGW 120 has received either the information in step 505 or in step 506, the PGW 120 may use the information as local charging credit or when online charging is used, return credit to the OCS i.e. the dropped packets is reported to the OCS as unexhausted quota, or add the dropped packet to the current authorized quota.

In some embodiments, the PGW 120 comprising the PCEF may further report the information to the PCRF 125 in order to get an updated policy decision, for example, decrease the Maximum Bit Rate (MBR), etc. In that embodiment, the PGW 120 transmits a CCR to the PCRF 125. CCR is short for Credit Control Request and is a message comprised in a credit control function. The PCRF 125 may adjust the charging or policy based on the received CCR.

Step 508

After receiving the CCR, the PCRF 125 replies to the PGW 120 with a Credit Control Answer (CCA). CCA is another message in the credit control function. Even though FIG. 5 only shows one CCR and one CCA message, the skilled person will understand that there might be several CCR and CCA messages transmitted between the PGW 120 and the PCRF 125.

The report of unsent/dropped data packets may be done periodically to the PGW 120 or directly to the PCRF 125 and OCS/OFCS 123 with 5-TUPLE or SCI information.

Figure 6:
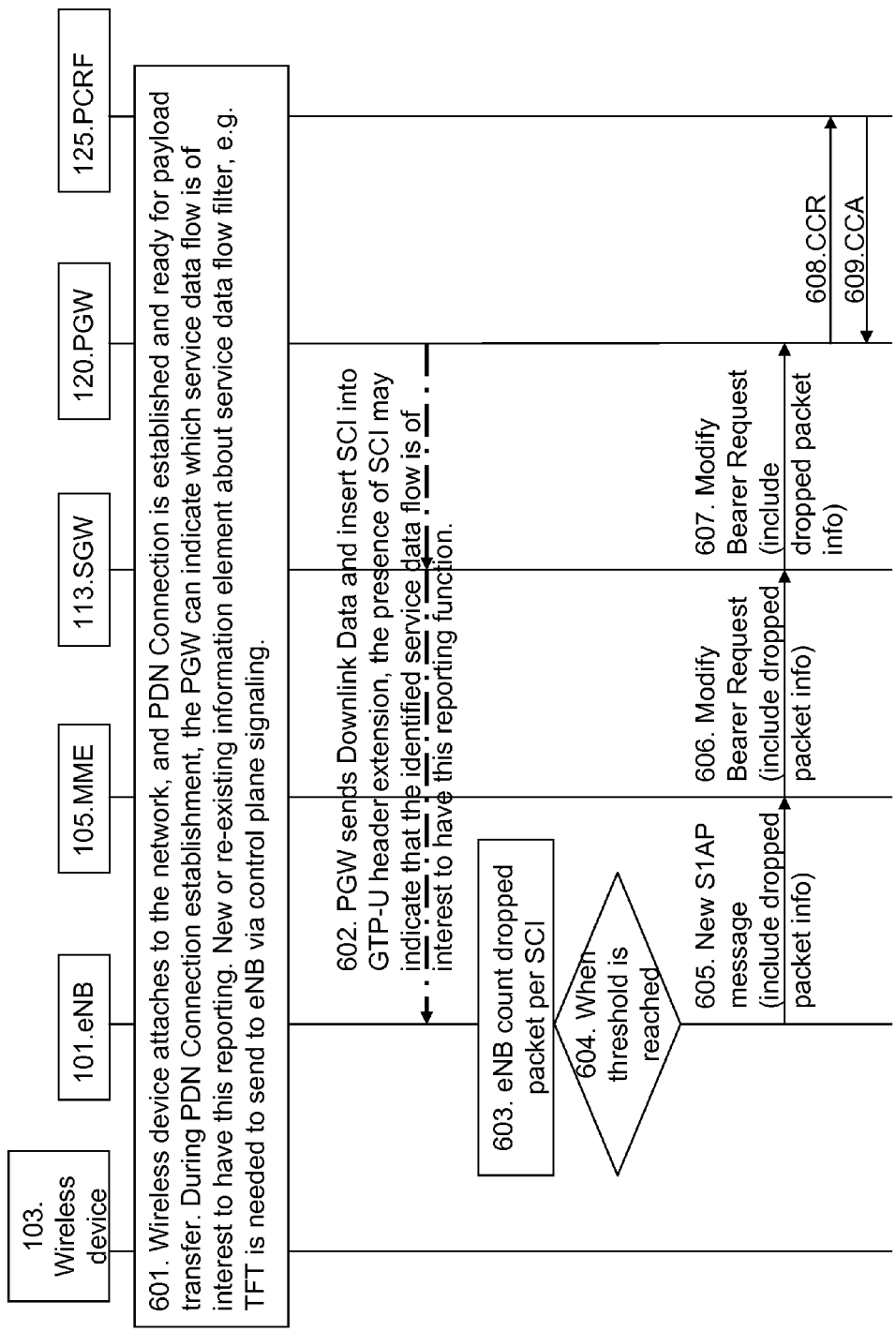
FIG. 6 is a signaling diagram illustrating embodiments of a method for reporting dropped packet information via the Control Plane.

The embodiment 3 will now be described in more detail relating to using the control plane to handle the dropped data packets. An embodiment of handling dropped data packets will now be described with reference to the signalling diagram in FIG. 6. FIG. 6 illustrates an example embodiment where information indicating dropped data packets is transmitted via the control plane, e.g. a S1AP and GTP-C v2, referred to as embodiment 3 above. In FIG. 6, the first network node 201 is represented by the eNB 101 and the policy node 215 is represented by the PGW 120 and the PCRF 125. Note that FIG. 6 is an example for E-UTRAN and therefore the message is S1AP. For GSM, the control plane path may be BSSGP and GTP v1 or GTPv2 and for UTRAN control plane path may be RANAP and GTP v2 or GTPv2. A new information element indicating dropped packet information together with 5-TUPLE or SCI, cause, service type and so on as indicated in the table 1 is included in existing control plane messages, or to new control plane signalling message. The method shown in FIG. 6 is an alternative embodiment to FIG. 5. The method comprises the following steps, which steps may be performed in any suitable order:

Step 601

This step corresponds to step 501 in FIG. 5. The wireless device 103 attaches to the network, and a PDN connection is established and ready for payload transfer. During PDN Connection establishment procedure, the eNB 101 indicates when it supports the embodiments herein in the request message. The MME 105 and the SGW 113 forwards such information to the PGW 120. During PDN Connection establishment, the PGW 120 may indicate when such reporting is supported and which service data flow is of interest to be subject to the handling of dropped data packets (see step 502). New or re-existing information element indicating service data flow filter, e.g. TFT is needed to send the information indicating the dropped data packets to the eNB 101 via control plane signaling.

Step 602

This step corresponds to step 502 in FIG. 5. The PGW 120 sends downlink data to the eNB 101 and may insert the parameter SCI into the GTP-U header extension. The presence of SCI may indicate that the identified service data flow is of interest to have this reporting function, i.e. the handling of dropped data packets.

Step 603

This step corresponds to step 503 in FIG. 5. The eNB 101 counts the dropped data packet per SCI, i.e. per data flow. The counts the dropped data packets until a trigger takes place, e.g. timer or the amount of packets or RAB release etc.

Step 604

This step corresponds to step 504 in FIG. 5. The eNB 101 detects when threshold has been reached. As mentioned earlier, the threshold may be related to the amount of dropped packets or to a timer. The threshold is then a trigger to transmit the information indicating the dropped data packets. The threshold may be configured in the eNB 101.

Step 605

The eNB 101 transmits an existing message, such as e.g. S1AP in EPS or RANAP in UMTS, or a new S1AP message comprising the dropped packet information to the MME 105. The S1AP message may comprise the 5-TUPLE or SCI. All users related S1AP and GTP-Cv2 may be used to carry this information element. S1AP is short for S1 Application Protocol and provides signaling service between E-UTRAN and the EPC. S1AP has many functions such as E-RAB management, Mobility, S1 interface management, Location Reporting etc.

As mentioned above, FIG. 6 is an example using E-UTRAN. However, the method is also valid for GSM and UTRAN. For GSM, the new message may be a BSSGP instead of S1AP and for UTRAN the new message may be a RANAP instead of the S1AP. BSSGP is the Base Station System (BSS) GPRS Protocol which provides radio related QoS and routing information that is required to transmit user data between a BSS and an SGSN. RANAP is short for Radio Access Network Application Part and is used for signaling between the UTRAN and the core network, e.g. MSC or SGSN.

The dropped packet information may comprise a negative CDR indicator, i.e. a negative amount to be deducted when generating the CDR.

Step 606

The MME 105 transmits a GTP-C message such as a Modify Bearer Request message or a new message comprising the dropped packet information to the SGW 113.

Step 607

The SGW 113 forwards the Modify Bearer Request message comprising the dropped packet information to the PGW 120.

Step 608

The PGW 120 receives the information in a GTP-Cv2 packet in step 607, parses the information and obtains the information indicating the dropped data packets on a 5-TUPLE or SCI granularity. The PGW 120 uses it as a local charging credit or as a return credit to the OCS. The PGW 120 transmits a CCR to the PCRF 125. The PCRF 125 may adjust the charging or policy based on the received CCR.

The PGW 120 may obtain the ID of the wireless device 103, for example the IMSI, from GTP-Cv2 message, and take a corresponding action such as e.g. use the amounts of over charged volume as local quota, or return quota to OCS. The PGW 120 may also take action according to the dropped cause, i.e. to remove or mitigate the cause of the dropped packets.

Step 609

After receiving the CCR, the PCRF 125 replies to the PGW 120 with a CCA.

Even though FIG. 6 only shows one CCR and one CCA message, the skilled person will understand that there might be several CCR and CCA messages transmitted between the PGW 120 and the PCRF 125.

The report of unsent/dropped data packets may be done periodically to the PGW 120 or directly to the PCRF 125 and OCS/OFCS 123 with the 5-TUPLE and the SCI information.

Figure 7:
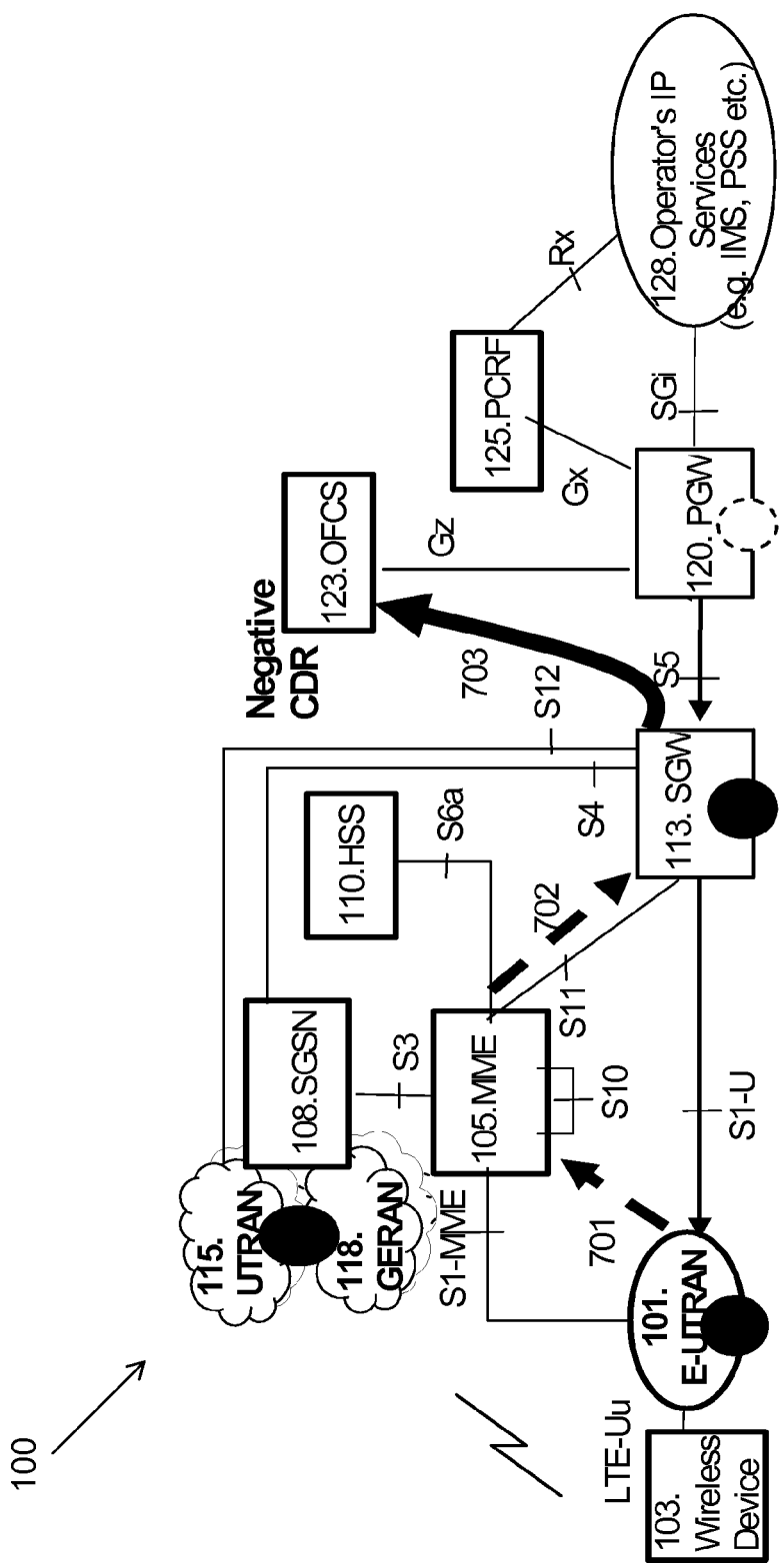
FIG. 7 is a schematic block diagram illustrating embodiments of a communications network where a SGW generates a negative CDR.
Figure 8:
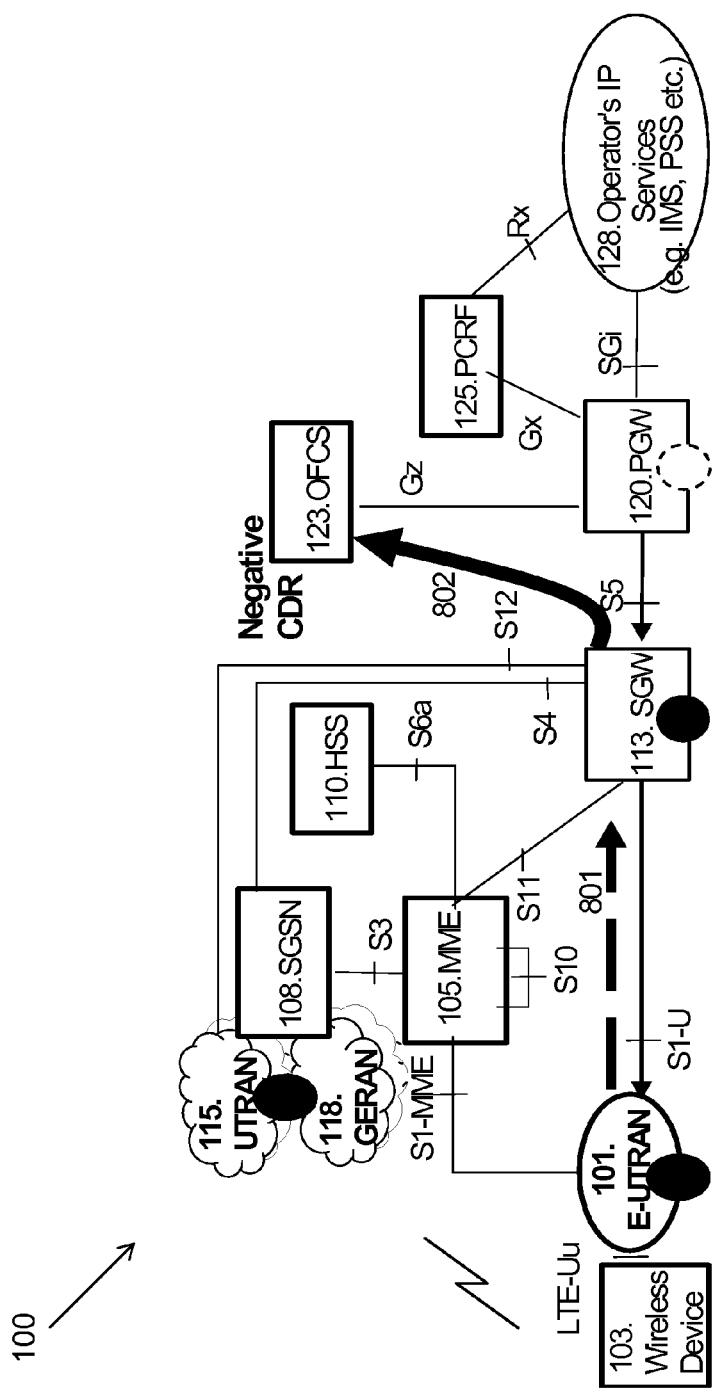
FIG. 8 is a schematic block diagram illustrating embodiments of a communications network where an eNB reports "discarded packets" information to SGW via GTP-U, and where a SGW generates a negative CDR.
Figure 9:
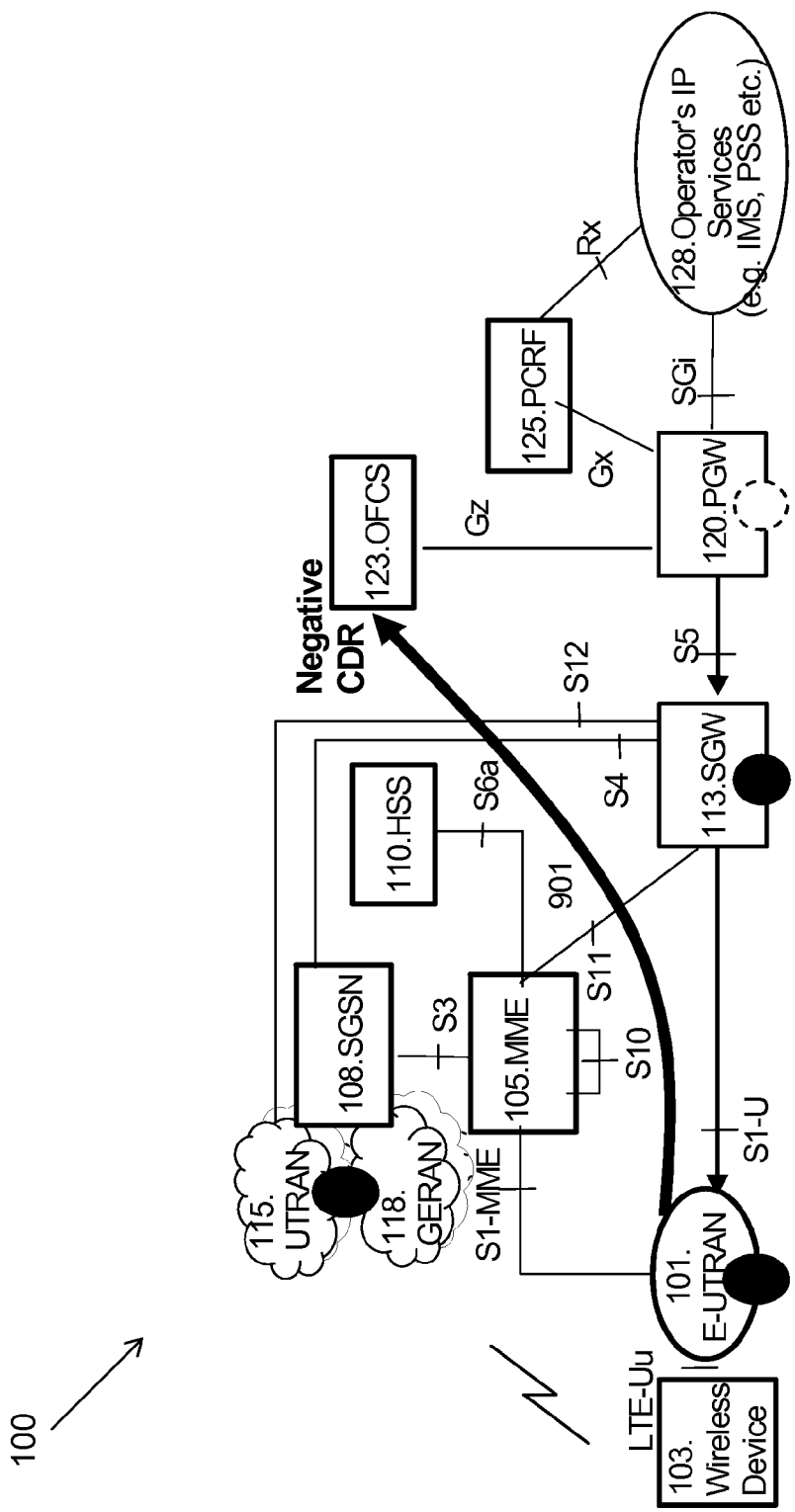
FIG. 9 is a schematic block diagram illustrating embodiments of a communications network where an eNB directly reports a negative CDR towards an OFCS.

The embodiment where the information indicating the dropped data packets comprise a negative CDR indicator will now be described with reference to FIGS. 7-9. In FIG. 7-9, the first network node is represented by the eNB 101 or a SGW 113, and the policy node 215 is represented by the OFCS 123. As mentioned earlier, when the node located after the PGW 120, e.g. the SGW 113 or the eNB 101, drops data packets, it may generate and send a negative CDR towards the OFCS directly. A flag in the CDR may be used to represent that the type of CDR is negative. The OFCS 123 knows the amount of data packets that has been dropped, so it may take an action to perform the correct charging. When policy node 215 which also have a charging function (for example, TDF), is deployed in the network, then the PGW 120 may also use the embodiment herein to report the negative CDR to the OFCS 123.

FIG. 7 is a schematic block diagram illustrating an embodiment of a method where the SGW 113 generates the negative CDR. The eNB 101 transmits information indicating the dropped data packets to the MME 105 via the S1AP, and the MME 105 forwards the information to the SGW 113 via the GTPv2-C. The method comprises the following steps, which steps may be performed in any suitable order:

Step 701

Figure 3:
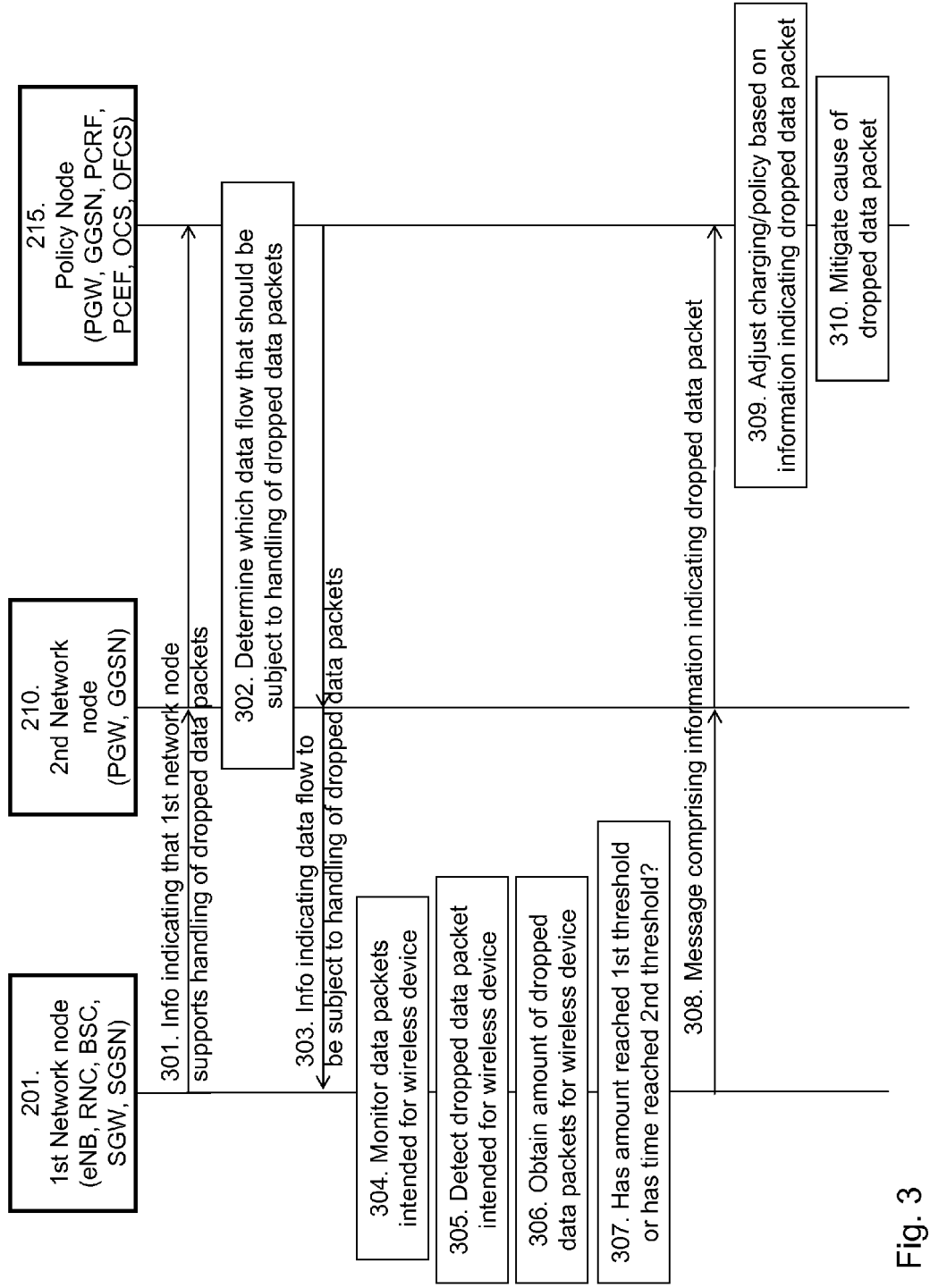
FIG. 3 is a schematic block diagram illustrating embodiments of sending dropped packet information to the SGW and/or PGW and/or GSGN and/or PCRFOCS/OFCS.

This step corresponds to steps 303-308 in FIG. 3, steps 503-506 in FIG. 5 and steps 603-607 in FIG. 6. In the downlink direction, when the eNB 101 drops data packets, the eNB 101 records the information indicating the dropped data packets. When the bearer is deactivated, the eNB 101 may report the "eNB Unsent Downlink Volume", i.e. information indicating the amount of dropped data packets, to the MME 105. The bearer is the one which the operator is interested in. It may be an indication from the MME, or PGW, or it may be pre-configured in eNB. The information may comprise a negative CDR indicator, i.e. a negative amount to be deducted when generating the CDR.

The eNB 101 may also transmit the information periodically. Indeed, as already indicated above, here the eNB 101 may obtain information indicating dropped data packets for the wireless device 103, and detect based on the obtained information that an the amount associated with the dropped data packets reaches a first threshold or that a timer associated with the dropped data packets reaches a second threshold, and then transmit a message to the MME 105. The message comprises at least one of information indicating the dropped data packets, e.g. the amount of dropped data packets, and information indicating that the amount has reached the first threshold or indicating that the timer has reached the second threshold.

Generally, the eNB 101 may e.g. obtain information indicating dropped data packets in any well known manner, e.g. by counting the packets transmitted by the eNB 101 to the wireless device 103, and then receiving a report from the wireless device 103 indicating the number of data packets actually. A simple comparison of the sent and received data packets will then give the number of dropped data packets.

Step 702

The MME 105 forwards the "eNB Unsent Downlink Volume" or similar, i.e. information indicating the amount of dropped data packets, to the SGW 113. The MME 105 may forward the information upon receipt or periodically.

Step 703

The SGW 113 generates the CDR and transmits it towards OFCS 123 when some packets are dropped in the SGW 113. Note that FIG. 7 shows an example where the SGW 113 drops data packets, but the eNB 101 might as well be the node which dropps data packets. The CDR comprises an indicator which may be referred to as a negative CDR or a dropped packet CDR. The indicator may be carried by a legacy reserved information element or by a new information element. It is also possible to use a Record extension. The SGW 113 may transmit the information directly after generating the CDR. Here the SGW 113 may also obtain information indicating dropped data packets for the wireless device 103, and detect based on the obtained information that an the amount associated with the dropped data packets reaches a first threshold or that a timer associated with the dropped data packets reaches a second threshold, and then transmit a message to the OFCS 130. The message comprises at least one of information indicating the dropped data packets, e.g. the amount of dropped data packets, and information indicating that the amount has reached the first threshold or indicating that the timer has reached the second threshold.

Generally, the SGW 113 may e.g. obtain information indicating dropped data packets in any well known manner, e.g. by counting the packets transmitted by the SGW 113 to the eNB 101 and/or to the wireless device 103, and then receiving a report from the eNB 101 and/or the wireless device 103 indicating the number of data packets actually received. A simple comparison of the sent and received data packets will then give the number of dropped data packets.

According to 3GPP 32.298 section 5.1.2.2.48, the Record Extensions is a field which enables network operators and/or manufacturers to add their own recommended extensions to the standard record definitions, as seen in Table 6 below. This field contains a set of "management extensions". This is conditioned upon the existence of an extension.

TABLE 6

| IE/Field | Description |
|---|---|
| Negative CDR indicator $O_C$ | Negative charging indicator $O_C$ |

The negative CDR indicator is a negative charging indicator. OC is a field that, if provisioned by the operator to be present, shall be included in the CDRs when the required conditions are met. In other words, an OC parameter that is configured to be present is a conditional parameter.

The OFCS 123 may make a proper decision based on this indicator and adjust the end users charging information.

FIG. 8 is a schematic block diagram illustrating an embodiment of a method where the SGW 113 generates the negative CDR. The eNB 101 transmits information indicating the dropped data packets to the SGW 113 via the GTPv1-U. The method comprises the following steps, which steps may be performed in any suitable order:

Step 801

This step corresponds to steps 303-308 in FIG. 3, steps 503-506 in FIG. 5 and steps 603-607 in FIG. 6. In the downlink direction, when the eNB 101 drops data packets, the eNB 101 records the information indicating the dropped data packets. When the bearer is deactivated, the eNB 101 may report the "eNB Unsent Downlink Volume", i.e. information indicating the amount of dropped data packets, directly to the SGW 105 via GTPv1-U. The eNB 101 may also transmit the information periodically. The information may comprise a negative CDR indicator, i.e. a negative amount to be deducted when generating the CDR.

Indeed, as already indicated above, here the eNB 101 may obtain information indicating dropped data packets for the wireless device 103, and detect based on the obtained information that an the amount associated with the dropped data packets reaches a first threshold or that a timer associated with the dropped data packets reaches a second threshold, and then transmit a message to the MME 105. The message comprises at least one of information indicating the dropped data packets, e.g. the amount of dropped data packets, and information indicating that the amount has reached the first threshold or indicating that the timer has reached the second threshold.

Step 802

The SGW 113 generates the CDR and transmits it towards OFCS 123 when some packets are dropped in the SGW 113 or the eNB 101. The CDR comprises an indicator which may be referred to as a negative CDR or a dropped packets CDR. The indicator may be carried by a legacy reserved information element or by a new information element. It is also possible to use the Record extension. The SGW 113 may transmit the information directly after generating the CDR.

Here the SGW 113 may also obtain information indicating dropped data packets for the wireless device 103, and detect based on the obtained information that an the amount associated with the dropped data packets reaches a first threshold or that a timer associated with the dropped data packets reaches a second threshold, and then transmit a message to the OFCS 130. The message comprises at least one of information indicating the dropped data packets, e.g. the amount of dropped data packets, and information indicating that the amount has reached the first threshold or indicating that the timer has reached the second threshold.

The OFCS 123 may make a proper decision based on this indicator and adjust the end users charging information.

FIG. 9 is a schematic block diagram illustrating an embodiment of a method where the SGW 113 generates the negative CDR. The eNB 101 transmits information indicating the dropped data packets directly to the OFCS 123. In this embodiment, the MME 105 should send the PGW IP address and the Charging ID to the eNB 101 via S1AP. The method comprises the following step:

Step 901

This step corresponds to steps 303-308 in FIG. 3, steps 503-506 in FIG. 5 and steps 603-607 in FIG. 6. In the downlink direction, the eNB 101 drops data packets, the eNB 101 records the information indicating the dropped data packets. When the bearer is deactivated, the eNB 101 generates the CDR and transmits it towards OFCS 123 when some packets are dropped in the SGW 113. The CDR comprises an indicator which may be referred to as a negative CDR or a dropped packet CDR. The indicator may be carried by a legacy reserved information element or by a new information element. It is also possible to use the Record extension. The eNB 101 may transmit the information directly after generating the CDR.

The OFCS 123 may make a proper decision based on this indicator and adjust the end users charging information.

Figure 10:
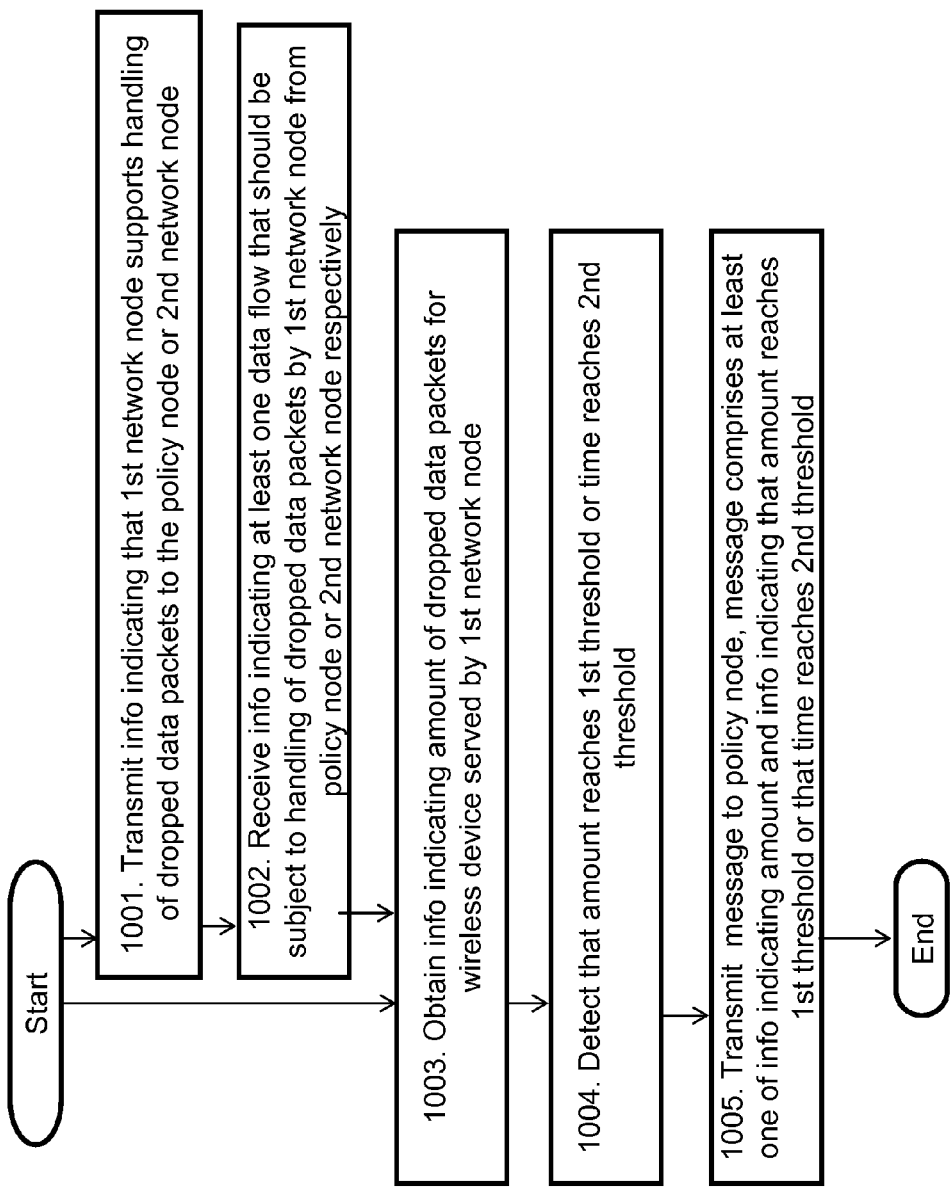
FIG. 10 is a flow chart illustrating embodiments of a method in a first network node.

The method described above will now be described seen from the perspective of the first network node 201. FIG. 10 is a flowchart describing the present method in the first network node 201 for handling dropped data packets in the communications network 100. The first network node 201 may be located in a downlink direction after the PGW 120 in the communications network 100. The first network node 201 may be at least one of eNB 101 and NodeB, and RNC and BSC and SGW 113 and SGSN 108. The method comprises the following steps which steps may be performed in any suitable order:

Step 1001

This step corresponds to step 301 in FIG. 3, step 501 in FIG. 5 and step 601 in FIG. 6. In some embodiments, the first network node 201 transmits to at least one of the policy node 215 and the second network node 210, information indicating that the first network node 201 supports handling of dropped data packets. In other words, the transmission may be to the policy node 215, to both the policy node 215 and the second network node 210 or only to the second network node 210. The second network node 210 may be a policy enforcing node 120, such as a PGW 120 or a GGSN or similar. The policy enforcing node 120 may comprise a PCEF.

The policy node 215 may be comprised in the OCS or in the OFCS. The policy node 215 may be a policy enforcing node or a policy deciding node. The policy enforcing node comprises a PCEF and may be a PGW 120 or a GGSN. The policy deciding node may comprise a PCRF 125.

Step 1002

This step corresponds to step 303 in FIG. 3, step 502 in FIG. 5 and step 602 in FIG. 6. In some embodiments, the first network node 201 receives information indicating at least one data flow that should be subject to the handling of dropped data packets by the first network node 201 from the policy node 215 or the second network node 210 respectively. The at least one data flow comprises data packets.

Step 1003

This step corresponds to step 304 in FIG. 3, step 503 in FIG. 5 and step 603 in FIG. 6. The first network node 201 obtains information indicating dropped data packets for the wireless device 103 served by the first network node 201. The dropped data packets may be per PDN connection, or per bearer context, or per service/application data flow for the wireless device 103.

Step 1004

This step corresponds to step 305 in FIG. 3, step 504 in FIG. 5 and step 04 in FIG. 6. The first network node 201 detects, based on the obtained information, that the amount associated with the dropped data packets reaches a first threshold or that a timer associated with the dropped data packets reaches a second threshold, e.g. the timer expires. The first threshold is exemplified in table 3 as 3400 bytes and the second threshold is exemplified in table 2 as 120 s.

Step 1005

This step corresponds to step 306 in FIG. 3, steps 505 and 506 in FIG. 5, steps 605, 606 and 607 in FIG. 6, steps 701, 702 and 703 in FIG. 7, steps 801 and 802 in FIG. 8 and step 901 in FIG. 9. The first network node 201 transmits a message to the policy node 215. The message comprises at least one of information indicating the amount of dropped data packets, and information indicating that the amount has reached the first threshold or indicating that the timer has reached the second threshold.

In some embodiments, the message comprises information indicating a cause of the dropping of the data packets. In some embodiments, the information indicating the amount is obtained by receipt from a radio access network node, or it is obtained by detecting the amount in the first network node 201. The message may be at least one of a GTP-U message and a CDR message and a GTP-C message. The message may comprise at least one of a 5-tuple and a SCI. The message may be transmitted periodically and/or when the first network node 201 detects that the amount reaches the threshold or that the timer expires. In some embodiments, the message is transmitted directly to the policy node 215. In some embodiments, the message is transmitted to the policy node 215 via another network node, such as e.g. the MME 105 and the SGW 113.

Figure 11:
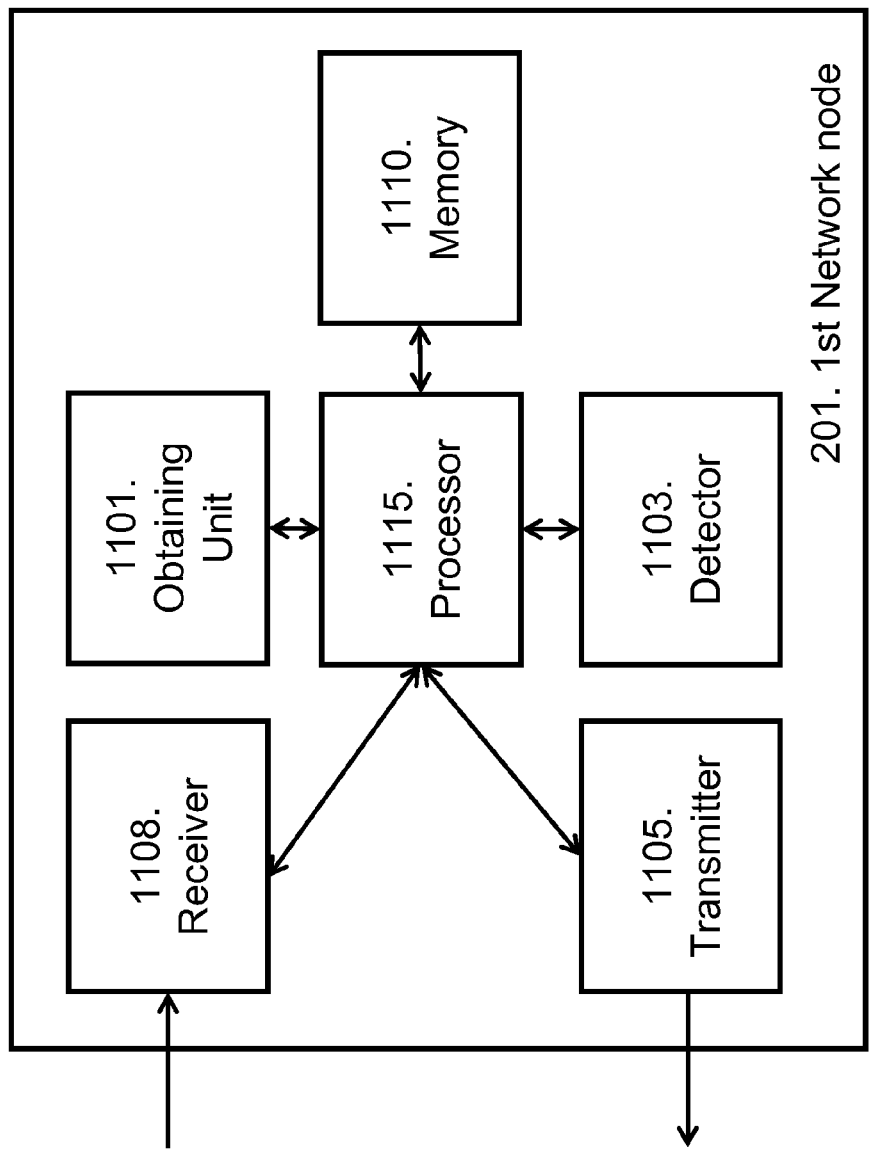
FIG. 11 is a schematic block diagram illustrating embodiments of a first network node.

To perform the method steps shown in FIG. 10 for handling dropped data packets in the communications network 100 the first network node 201 comprises an arrangement as shown in FIG. 11. The first network node 201 may be adapted to be located in a downlink direction after the PGW 120 in the communications network 100. The first network node 201 may be at least one of eNB 101 and NodeB and RNC and BSC and SGW 113 and SGSN 108.

The first network node 201 comprises an obtaining unit 1101 which is adapted to obtain information indicating dropped data packets for a wireless device 103 served by the first network node 201. The obtaining unit 1101 may be adapted to obtain the information indicating by receipt from a radio access network node or by detecting the amount in the first network node 201. The dropped data packets may be per PDN connection, or per bearer context, or per service/application data flow for the wireless device 103.

The first network node 201 comprises a detector 1103 adapted to detect, based on the obtained information, that the amount reaches the first threshold or that the timer associated with the dropped data packets reaches the second threshold. The first threshold is exemplified in table 3 as 3400 bytes and the second threshold is exemplified in table 2 as 120 s.

The first network node 201 comprises a transmitter 1105 which is adapted to transmit a message to the policy node 215. The message comprises at least one of information indicating the dropped data packets, e.g. the amount of dropped data packets, and information indicating that the amount has reached the first threshold or that the timer has reached the second threshold. The transmitter 1105 may be further adapted to transmit to at least one of the policy node 215 or the second network node 210 information indicating that the first network node 201 supports handling of dropped data packets. The second network node 210 may be a policy enforcing node 120. In some embodiments, the message comprises information indicating a cause of the dropping of the data packets. The message may be at least one of a GTP-U message and a GTP-C message and a CDR message. The message may comprise at least one of a 5-tuple and a SCI. In some embodiments, the transmitter 1105 is adapted to transmit the message periodically and/or to transmit the message when the detector 1103 has detected that the amount reaches the first threshold or that the timer has reached the second threshold. In some embodiments, the transmitter 1105 is adapted to transmit the message directly to the policy node 225 or to transmit the message to the policy node 215 via another network node 105, 113. 29. The policy node 215 may be comprised in the OCS or in the OFCS. The policy node 215 may be a policy enforcing node or a policy deciding node. The policy enforcing node may comprise the PCEF, and may be the PGW 120 or the GGSN. The policy deciding node may comprise the PCRF 125.

The first network node 201 may further comprise a receiver 1108 adapted to receive information indicating at least one data flow that should be subject to the handling of dropped data packets by the first network node 201 from the policy node 215 or the second network node 210 respectively. The at least one data flow comprises data packets.

The first network node 201 may further comprise a memory 1110 comprising one or more memory units. The memory 1110 is arranged to be used to store data, received data streams, power level measurements, amount of dropped data packets, timer, negative CDR, cause, messages, threshold values, time periods, configurations, schedulings, and applications to perform the methods herein when being executed in the first network node 201.

Those skilled in the art will also appreciate that the obtaining unit 1101, the detector 1103, the transmitter 1105 and the receiver 1108, described above may refer to a combination of analog and digital circuits, and/or one or more processors configured with software and/or firmware, e.g. stored in the memory 1110, that when executed by the one or more processors such as the processor 1115 perform as described below.

Figure 12:
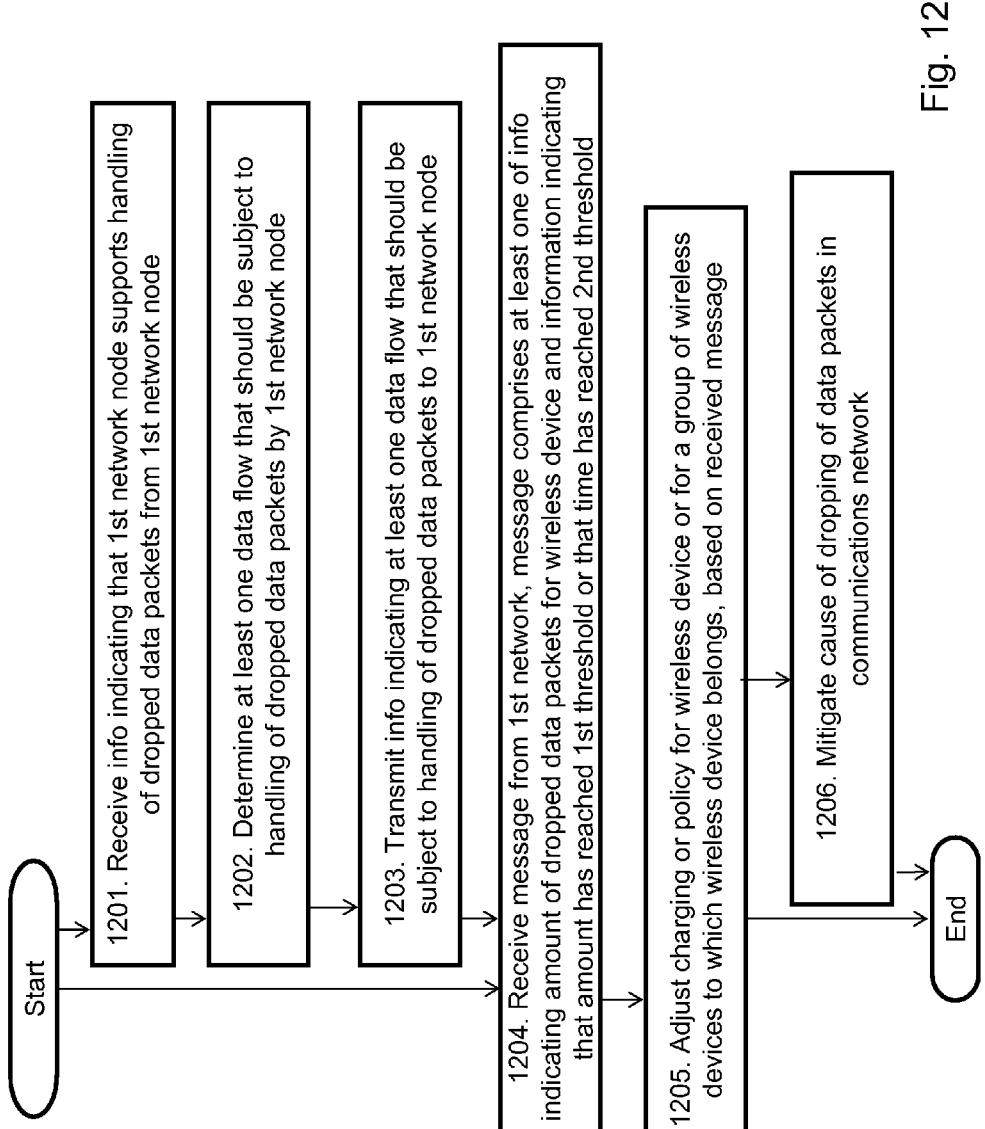
FIG. 12 is a flow chart illustrating embodiments of a method in a charging node.

The method described above will now be described seen from the perspective of the policy node 215. FIG. 12 is a flowchart describing the present method in the policy node 215 for handling dropped data packets in the communications network 100. The policy node 215 may be comprised in an OCS or in an OFCS. In some embodiments, the policy node 215 is a policy enforcing node or a policy deciding node. The policy enforcing node may comprise a PCEF and may be a PGW 120 or a GGSN. The policy deciding node may comprise a PCRF 125. The method comprises the following steps which steps may be performed in any suitable order:

Step 1201

This step corresponds to step 301 in FIG. 3, step 501 in FIG. 5 and step 601 in FIG. 6. In some embodiments, the policy node 215 receives, from the first network node 201, information indicating that the first network node 201 supports handling of dropped data packets. As mentioned above, the first network node 201 may be located in a downlink direction after the PGW 120 in the communications network 100. The first network node 201 may be is at least one of eNB 101 and NodeB and RNC and BSC and SGW 113 and SGSN 108.

Step 1202

This step corresponds to step 302 in FIG. 3. In some embodiments, the policy node 215 determines at least one data flow that should be subject to the handling of dropped data packets by the first network node 201. The at least one data flow comprises data packets.

Step 1203

This step corresponds to step 303 in FIG. 3, step 502 in FIG. 5 and step 602 in FIG. 6. In some embodiments, the policy node 215 transmits information indicating the at least one data flow that should be subject to the handling of dropped data packets to the first network node 201.

Step 1204

This step corresponds to step 306 in FIG. 3, steps 505 and 506 in FIG. 5, steps 605, 606 and 607 in FIG. 6, step 701, 702 and 703 in FIG. 7, steps 801 and 802 in FIG. 8 and step 901 in FIG. 9. The policy node 215 receives the message from the first network node 201. The message comprises at least one of information indicating dropped data packets for a wireless device 103 and information indicating that the amount associated with the dropped data packets has reached a first threshold or indicating that a timer associated with the dropped data packets has reached the second threshold. The wireless device 103 is served by the first network node 201. The first threshold is exemplified in table 3 as 3400 bytes and the second threshold is exemplified in table 2 as 120 s. The dropped data packets may be per PDN connection, or per bearer context, or per service/application data flow for the wireless device 103.

The message may comprise information indicating the cause of the dropping of the data packets.

Step 1205

This step corresponds to step 307 in FIG. 3. The policy node 215 adjusts the charging or policy for the wireless device 103 or for a group of wireless devices to which the wireless device 103 belongs, based on the received message. The group may e.g. be identified by the wireless devices associated with the same Access Point Name (APN), Cell, e.g. Cell ID, Tracking Area (TA) or similar.

Step 1205a

This step is a substep of step 1205. In some embodiments, the policy node 215 generates a CDR based on deduction of the amount of dropped data packets, i.e. the negative CDR described above with reference to FIGS. 7-9.

Step 1206

This step corresponds to step 308 in FIG. 3. In some embodiments, the policy node 215 mitigates the cause of the dropping of the data packets in the communications network 100.

Figure 13:
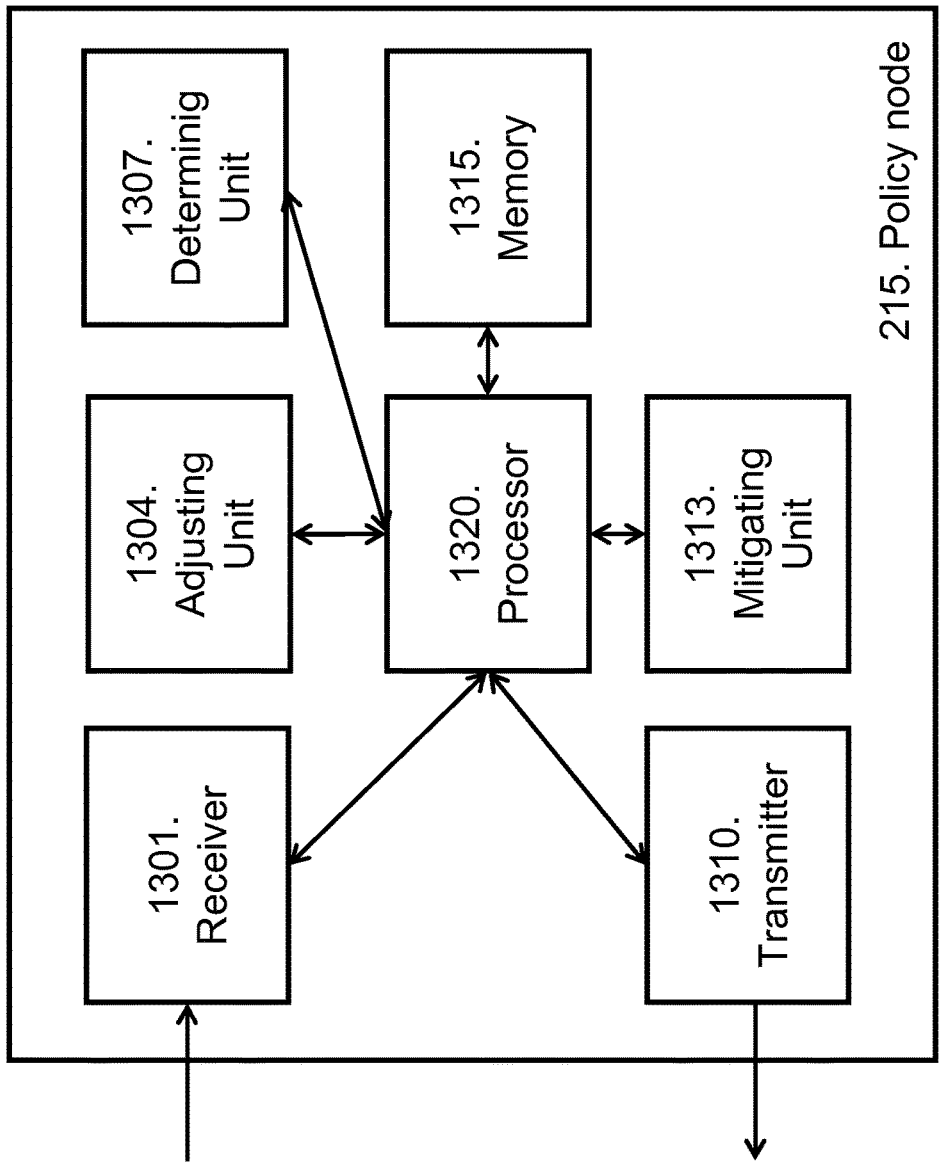
FIG. 13 is a schematic block diagram illustrating embodiments of a charging node.

To perform the method steps shown in FIG. 12 for handling dropped data packets in the communications network 100 the policy node 215 comprises an arrangement as shown in FIG. 13. The policy node 215 may be comprised in the OCS or in the OFCS. The policy node may be a policy enforcing node or a policy deciding node. The policy enforcing node may comprise the PCEF, and may be the PGW 120 or the GGSN. The policy deciding node may comprise the PCRF 125.

The policy node 215 comprises a receiver 1301 which is adapted to receive a message from the first network node 201. The message comprises at least one of information indicating dropped data packets for a wireless device 103 and information indicating that the amount associated with the dropped data packets has reached the first threshold or that the timer associated with the dropped packets has reached the second threshold. The first threshold is exemplified in table 3 as 3400 bytes and the second threshold is exemplified in table 2 as 120 s. The wireless device 103 may be adapted to be served by the first network node 201. The receiver 1301 may be further adapted to receive information indicating that the first network node 201 supports handling of dropped data packets from the first network node 201. The message may comprise information indicating the cause of the dropping of the data packets. The first network node 201 may be is adapted to be located in a downlink direction after the PGW 120 in the communications network 100. The first network node 201 may be at least one of eNB 101 and NodeB and RNC and BSC and SGW 113 and SGSN 108.

The policy node 215 comprises an adjusting unit 1304 adapted to adjust charging or policy for the wireless device 103 or for a group of wireless devices to which the wireless device 103 belongs, based on the received message. The adjusting unit 1304 may generate a CDR based on deduction of the amount of dropped data packets.

The policy node 215 may further comprise a determining unit 1307 adapted to determine at least one data flow that should be subject to the handling of dropped data packets by the first network node 201. The at least one data flow may comprise data packets.

The policy node 215 may further comprise a transmitter 1310 adapted to transmit information indicating the at least one data flow that should be subject to the handling of dropped data packets to the first network node 201.

The policy node 215 may further comprise a mitigating unit 1313 adapted to mitigate the cause of the dropping of the data packets in the communications network 100.

The policy node 215 may further comprise a memory 1315 comprising one or more memory units. The memory 1315 is arranged to be used to store data, received data streams, power level measurements, amount of dropped data packets, timer, negative CDR, cause, messages, threshold values, time periods, configurations, schedulings, and applications to perform the methods herein when being executed in the policy node 215.

Those skilled in the art will also appreciate that the receiver 1301, the adjusting unit 1304, the determining unit 1307, the transmitter 1310 and the mitigating unit 1313 described above may refer to a combination of analog and digital circuits, and/or one or more processors configured with software and/or firmware, e.g. stored in the memory 1315, that when executed by the one or more processors such as the processor 1320 perform as described below.

The present mechanism for handling dropped data packets in a communications network 100 may be implemented through one or more processors, such as a processor 1115 in the first network node arrangement depicted in FIG. 11 and a processor 1320 in the policy node arrangement depicted in FIG. 13, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the first network node 201 and/or policy node 215. One such carrier may be in the form of a CD ROM disc. It is however feasible with other data carriers such as a memory stick. The computer program code may furthermore be provided as pure program code on a server and downloaded to the first network node 201 and/or policy node 215.

Some embodiments herein may be summarized as follows.

Defining which target wireless device 103/wireless device group that should be considered. This may be done by e.g. the PGW 120 or the PCRF 125.

Generating dropped packet information.

The first network node 201 monitors the dropped packet information.

A threshold related to the amount of dropped data packets to control generation of information A timer related to control of the report time.

Reporting "dropped packet information" using different ways:

For example to the PGW 120, via control plane or user plane

For example to the PCRF 125, via the PGW 120 or using a direct message transfer.

For example to the OFCS 123, via the PGW 120 or using a direct message transfer or using a negative CDR.

Adjusting policy and charging.

Some embodiments herein may also be summarized as follows.

One embodiment is directed to a method in a first network node for handling dropped data packets in a communications network. The method comprises the actions of: obtaining information indicating dropped data packets for a wireless device served by the first network node; detecting based on the obtained information that an amount associated with the dropped data packets reaches a first threshold or that a timer associated with the dropped data packets reaches a second threshold; and transmitting a message to a policy node, which message comprises at least one of information indicating the amount associated with the dropped data packets or information indicating that the amount has reached the first threshold or indicating that the timer has reached the second threshold.

The method may further comprise the actions of: transmitting to at least one of the policy node or a second network node, information indicating that the first network node supports handling of dropped data packets; and receiving information indicating at least one data flow that should be subject to the handling of dropped data packets by the first network node from the policy node or the second network node respectively, wherein the at least one data flow comprises data packets.

The second network node may be a policy enforcing node.

The message may comprise information indicating a cause of the dropping of the data packets.

The information indicating dropped data packets may be obtained by receipt from a radio access network node; or the information indicating dropped data packets may be obtained by detecting dropped data packets in the first network node.

The message may be at least one of a General packet radio service Tunneling Protocol for User Plane, GTP-U, message or a Charging Data Record, CDR, message or a GTP for Control plane GTP-C message.

The message may comprise at least one of a 5-tuple or a Service Class Indicator, SCI.

The message may be transmitted periodically and/or when detecting that the amount reaches the first threshold or that the timer reaches the second threshold.

The message may be transmitted directly to the policy node; or the message may be transmitted to the policy node via another network node.

The first network node may be located in a downlink direction after a Packet data network GateWay, PGW in the communications network; and the first network node may be at least one of evolved NodeB, eNB, NodeB, or Radio Network Controller, RNC, or Base Station Controller, BSC and Serving GateWay, SGW or Serving General packet radio service Support Node, SGSN.

The policy node may be comprised in an Online Charging System, OCS, or in an OFfline Charging System, OFCS.

The policy node may be a policy enforcing node or a policy deciding node, wherein the policy enforcing node is a Packet data network GateWay, PGW or a Gateway General packet radio service Support Node, GGSN comprising a Policy and Charging Enforcement Function, PCEF, and wherein the policy deciding node comprises a Policy and Charging Rules Function, PCRF.

Some other embodiments herein may be summarized as follows:

One other embodiment is directed to a method in a policy node for handling dropped data packets in a communications network. The method comprises the actions of: receiving a message from a first network node serving a wireless device, which message comprises at least one of information indicating an amount associated with dropped data packets for the wireless device or information indicating that the amount associated with the dropped data packets has reached a first threshold or indicating that a timer associated with the dropped data packets has reached a second threshold; and adjusting charging or policy for the wireless device or for a group of wireless devices to which the wireless device belongs, based on the received message.

The method may further comprise the actions of: receiving, from the first network node, information indicating that the first network node supports handling of dropped data packets; and determining at least one data flow that should be subject to the handling of dropped data packets by the first network node, wherein the at least one data flow comprises data packets; and transmitting information indicating the at least one data flow that should be subject to the handling of dropped data packets to the first network node.

The adjusting of charging or policy further comprises the actions of: generating a Charging Data Record, CDR, based on deduction of the amount of dropped data packets.

The message may comprise information indicating a cause of the dropping of the data packets, and the method may further comprise the actions of: mitigating the cause of the dropping of the data packets in the communications network.

The first network node may be located in a downlink direction after a Packet data network GateWay, PGW in the communications network; and the first network node may be at least one of evolved NodeB, eNB (101), NodeB, or Radio Network Controller, RNC, or Base Station Controller, BSC or Serving GateWay, SGW (113) or Serving General packet radio service Support Node, SGSN (108).

The policy node may beis comprised in an Online Charging System, OCS, or in an OFfline Charging System, OFCS.

The policy node may be a policy enforcing node or a policy deciding node, wherein the policy enforcing node comprises a Policy and Charging Enforcement Function, PCEF, and is a Packet data network GateWay, PGW or a Gateway General packet radio service Support Node, GGSN, and wherein the policy deciding node comprises a Policy and Charging Rules Function, PCRF.

Some other embodiments herein may be summarized as follows:

One other embodiment may be a first network node configured to operatively handle dropped data packets in a communications network. The first network node comprises: an obtaining unit adapted to obtain information indicating dropped data packets for a wireless device served by the first network node; a detector adapted to detect based on the obtained information that an amount associated with the dropped data packets reaches a first threshold or that a timer associated with the dropped data packets reaches a second threshold; and a transmitter adapted to transmit a message to a policy node, which message comprises at least one of information indicating the amount associated with the dropped data packets or information indicating that the amount has reached the first threshold or indicating that the timer has reached the second threshold.

The transmitter may be further adapted to transmit to at least one of the policy node or a second network node, information indicating that the first network node supports handling of dropped data packets; and wherein the first network node further comprises: a receiver adapted to receive information indicating at least one data flow that should be subject to the handling of dropped data packets by the first network node from the policy node or the second network node respectively, wherein the at least one data flow comprises data packets.

The second network node may be a policy enforcing node.

The message may comprise information indicating a cause of the dropping of the data packets.

The obtaining unit may be adapted to obtain the information indicating dropped data packets by receipt from a radio access network node or by detecting dropped data packets in the first network node.

The message may be at least one of a General packet radio service Tunneling Protocol for User Plane, GTP-U, message or a GTP for Control plane, GTP-C, message or a Charging Data Record, CDR, message.

The message may comprise at least one of a 5-tuple or a Service Class Indicator, SCI.

The transmitter may be adapted to transmit the message periodically and/or to transmit the message when the detector has detected that the amount reaches the first threshold or that the timer has reached the second threshold.

The transmitter may be adapted to transmit the message directly to the policy node or to transmit the message to the policy node via another network node.

The first network node may be adapted to be located in a downlink direction after a Packet data network GateWay, PGW in the communications network; and wherein the first network node may be at least one of evolved NodeB, eNB, or NodeB, or Radio Network Controller, RNC, or Base Station Controller, BSC or Serving GateWay, SGW or Serving General packet radio service Support Node, SGSN.

The policy node may be comprised in an Online Charging System, OCS, or in an OFfline Charging System, OFCS.

The policy node may be a policy enforcing node or a policy deciding node, wherein the policy enforcing node is a Packet data network GateWay, PGW or a Gateway General packet radio service Support Node, GGSN, comprising a Policy and Charging Enforcement Function, PCEF, and wherein the policy deciding node comprises a Policy and Charging Rules Function, PCRF.

Some other embodiments herein may be summarized as follows:

One other embodiment may be a policy node configured to operatively handle dropped data packets in a communications network. The policy node comprises: a receiver adapted to receive a message from a first network node serving a wireless device, which message comprises at least one of information indicating an amount of dropped data packets for the wireless device or information indicating that the amount associated with the dropped data packets has reached a first threshold or that a timer associated with the dropped data packets has reached a second threshold; and an adjusting unit adapted to adjust charging or policy for the wireless device or for a group of wireless devices to which the wireless device belongs, based on the received message.

The receiver may be further adapted to receive information indicating that the first network node supports handling of dropped data packets from the first network node; wherein the policy node further comprises: a determining unit adapted to determine at least one data flow that should be subject to the handling of dropped data packets by the first network node, wherein the at least one data flow comprises data packets; and a transmitter adapted to transmit information indicating the at least one data flow that should be subject to the handling of dropped data packets to the first network node.

The adjusting unit may be further adapted to generate a Charging Data Record, CDR, based on deduction of the amount of dropped data packets.

The message may comprise information indicating a cause of the dropping of the data packets, and wherein the policy node further comprises: a mitigating unit adapted to mitigate the cause of the dropping of the data packets in the communications network.

The policy node may be comprised in an Online Charging System, OCS, or in an OFfline Charging System, OFCS.

The may be a policy enforcing node or a policy deciding node, wherein the policy enforcing node comprises a Policy and Charging Enforcement Function, PCEF, and is a Packet data network GateWay, PGW or a Gateway General packet radio service Support Node, GGSN, and wherein the policy deciding node comprises a Policy and Charging Rules Function, PCRF.

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements. The term "adapted to" used herein may also be referred to as "arranged to" or "configured to".

It should also be emphasised that the steps of the methods defined in the appended claims may, without departing from the embodiments herein, be performed in another order than the order in which they appear in the claims.

The invention claimed is:

1. A method in a first network node for handling dropped data packets in a communications network, the method comprising:
obtaining information indicating dropped data packets for a wireless device served by the first network node, wherein the first network node is located in a downlink direction after a Packet data network Gateway (PGW) in the communications network, wherein the first network node is at least one of: an evolved NodeB (eNB), an NodeB, a Radio Network Controller (RNC), a Base Station Controller (BSC), a Serving Gate Way (SGW), and a Serving General packet radio service Support Node SGSN;

detecting based on the obtained information that an amount associated with the dropped data packets reaches a first threshold or that a timer associated with the dropped data packets reaches a second threshold; and transmitting a message to a policy node, which message comprises at least one of information indicating the amount associated with the dropped data packets or information indicating that the amount has reached the first threshold or information indicating that the timer has reached the second threshold.

2. The method according to claim 1, further comprising:
transmitting to at least one of the policy node or a second network node, information indicating that the first network node supports handling of dropped data packets; and receiving information indicating at least one data flow that should be subject to the handling of dropped data packets by the first network node from the policy node or the second network node respectively, wherein the at least one data flow comprises data packets.

3. The method according to claim 1, wherein the message comprises information indicating a cause of the dropping of the data packets.

4. The method according to claim 1, wherein the information indicating dropped data packets is obtained by receipt from a radio access network node; or
wherein the information indicating dropped data packets is obtained by detecting dropped data packets in the first network node.

5. The method according to claim 1, wherein the message is transmitted periodically and/or when detecting that the amount reaches the first threshold or that the timer reaches the second threshold.

6. The method according to claim 1, wherein the message is transmitted directly to the policy node; or
wherein the message is transmitted to the policy node via another network node.

7. A method in a policy node for handling dropped data packets in a communications network, the method comprising:
receiving a message from a first network node serving a wireless device, which message comprises at least one of information indicating an amount associated with dropped data packets for the wireless device or information indicating that the amount associated with the dropped data packets has reached a first threshold or information indicating that a timer associated with the dropped data packets has reached a second threshold, wherein the first network node is located in a downlink direction after a Packet data network Gateway (PGW) in the communications network, and wherein the first network node is one of: an evolved NodeB (eNB), a NodeB, a Radio Network Controller (RNC), a Base Station Controller (BSC), a Serving Gateway (SGW), and a Serving General packet radio service Support Node (SGSN); and adjusting charging or policy for the wireless device or for a group of wireless devices to which the wireless device belongs, based on the received message.

8. The method according to claim 7, further comprising:
receiving, from the first network node, information indicating that the first network node supports handling of dropped data packets;

determining at least one data flow that should be subject to the handling of dropped data packets by the first network node, wherein the at least one data flow comprises data packets; and transmitting information indicating the at least one data flow that should be subject to the handling of dropped data packets to the first network node.

9. The method according to claim 7, wherein the adjusting charging or policy further comprises:
generating a Charging Data Record, CDR, based on deduction of the amount of dropped data packets.

10. The method according to claim 7, wherein the message comprises information indicating a cause of the dropping of the data packets, and wherein the method further comprises:
mitigating the cause of the dropping of the data packets in the communications network.

11. A first network node for handling dropped data packets in a communications network, the first network node comprising:
a receiver;
a transmitter;
a memory; and
one or more processors coupled to the memory, transmitter, and receiver, said one or more processors being configured to:
obtain information indicating dropped data packets for a wireless device served by the first network node;
detect based on the obtained information that an amount associated with the dropped data packets reaches a first threshold or that a timer associated with the dropped data packets reaches a second threshold; and
employ the transmitter to transmit a message to a policy node, which message comprises at least one of information indicating the amount associated with the dropped data packets or information indicating that the amount has reached the first threshold or information indicating that the timer has reached the second threshold, wherein
the first network node is located in a downlink direction after a Packet data network Gateway (PGW) in the communications network, and
the first network is one of: an evolved NodeB eNB a NodeB Radio Network Controller (RNC), a Base Station Controller (BSC), a Serving Gateway (SGW), and a Serving General packet radio service Support Node (SGSN).

12. The first network node according to claim 11, wherein the transmitter is further adapted to transmit to at least one of the policy node or a second network node, information indicating that the first network node supports handling of dropped data packets; and wherein the first network node further comprises:
a receiver adapted to receive information indicating at least one data flow that should be subject to the handling of dropped data packets by the first network node from the policy node or the second network node respectively, wherein the at least one data flow comprises data packets.

13. The first network node according to claim 12, wherein the second network node is a policy enforcing node.

14. The first network node according to claim 11, wherein the message comprises information indicating a cause of the dropping of the data packets.

15. The first network node according to claim 11, wherein the obtaining unit is adapted to obtain the information indicating dropped data packets by receipt from a radio access network node or by detecting dropped data packets in the first network node.

16. The first network node according to claim 11, wherein the message is at least one of a General packet radio service Tunnelling Protocol for User Plane, GTP-U, message or a GTP for Control plane, GTP-C, message or a Charging Data Record, CDR, message.

17. The first network node according to claim 11, wherein the message comprises at least one of a 5-tuple or a Service Class Indicator, SCI.

18. The first network node according to claim 11, wherein the transmitter is adapted to transmit the message periodically and/or to transmit the message when the detector has detected that the amount reaches the first threshold or that the timer has reached the second threshold.

19. The first network node according to claim 11, wherein the transmitter is adapted to transmit the message directly to the policy node or to transmit the message to the policy node via another network node.

20. The first network node according to claim 11, wherein the policy node is comprised in an Online Charging System, OCS, or in an OFfline Charging System, OFCS.

21. The first network node according to claim 11, wherein the policy node is a policy enforcing node or a policy deciding node, wherein the policy enforcing node is a Packet data network GateWay, PGW or a Gateway General packet radio service Support Node, GGSN, comprising a Policy and Charging Enforcement Function, PCEF, and wherein the policy deciding node comprises a Policy and Charging Rules Function, PCRF.

22. A policy node for handling dropped data packets in a communications network, the policy node comprising:
 a memory;
 a transmitter;
 a receiver for receiving a message from a first network node serving a wireless device, which message comprises at least one of information indicating an amount of dropped data packets for the wireless device or information indicating that the amount associated with the dropped data packets has reached a first threshold or information indicating that a timer associated with the dropped data packets has reached a second threshold; and
 one or more processors coupled to the memory, transmitter, and receiver, said one or more processors being configured to adjust charging or policy for the wireless device or for a group of wireless devices to which the wireless device belongs, based on the received message, wherein
 the first network node is located in a downlink direction after a Packet data network Gateway (PGW) in the communications network, and
 the first network node is one of: an evolved NodeB (eNB), a NodeB, a Radio Network Controller (RNC), a Base Station Controller (BSC), a Serving Gateway (SGW), and a Serving General packet radio service Support Node (SGSN).

23. The policy node according to claim 22, wherein the receiver is further adapted to receive information indicating that the first network node supports handling of dropped data packets from the first network node; wherein the policy node further comprises:
 a determining unit adapted to determine at least one data flow that should be subject to the handling of dropped data packets by the first network node, wherein the at least one data flow comprises data packets; and
 a transmitter adapted to transmit information indicating the at least one data flow that should be subject to the handling of dropped data packets to the first network node.

24. The policy node according to claim 22, wherein the adjusting unit is further adapted to generate a Charging Data Record, CDR, based on deduction of the amount of dropped data packets.

25. The policy node according to claim 22, wherein the message comprises information indicating a cause of the dropping of the data packets, and wherein the policy node further comprises:
 a mitigating unit adapted to mitigate the cause of the dropping of the data packets in the communications network.

26. The policy node according to claim 22, wherein the policy node is comprised in an Online Charging System, OCS, or in an OFfline Charging System, OFCS.

27. The policy node according to claim 22, wherein the policy node is a policy enforcing node or a policy deciding node, wherein the policy enforcing node comprises a Policy and Charging Enforcement Function, PCEF, and is a Packet data network GateWay, PGW or a Gateway General packet radio service Support Node, GGSN, and wherein the policy deciding node comprises a Policy and Charging Rules Function, PCRF.

* * * * *